United States Patent
Weber et al.

(10) Patent No.: US 11,188,041 B2
(45) Date of Patent: *Nov. 30, 2021

(54) CONTROL SYSTEM AND METHOD FOR MANAGING WIRELESS AND WIRED COMPONENTS

(71) Applicant: Hubbell Incorporated, Shelton, CT (US)

(72) Inventors: Theodore E. Weber, Round Rock, TX (US); Terrence R. Arbouw, Georgetown, TX (US); Ronald K. Bender, Dripping Springs, TX (US); Ronald J. Cummings-Kralik, St. Louis, MO (US); Michael D. Crane, Round Rock, TX (US); Thomas J. Hartnagel, Taylor, TX (US); Robert A. Martin, Pflugerville, TX (US); Peter A. Moyle, Austin, TX (US); Gregory F. Smith, San Antonio, TX (US); Stephan K. Zitz, Round Rock, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,781

(22) Filed: Jan. 6, 2020

(65) Prior Publication Data
US 2020/0142367 A1   May 7, 2020

Related U.S. Application Data

(63) Continuation of application No. 13/299,266, filed on Nov. 17, 2011, now Pat. No. 10,564,613.
(Continued)

(51) Int. Cl.
*G05B 15/02* (2006.01)
*H05B 47/19* (2020.01)

(52) U.S. Cl.
CPC ............. *G05B 15/02* (2013.01); *H05B 47/19* (2020.01); *G05B 2219/2642* (2013.01)

(58) Field of Classification Search
USPC ......................................................... 700/275
See application file for complete search history.

(56) References Cited

U.S. PATENT DOCUMENTS

| 4,523,128 A | 6/1985 | Stamm et al. |
| 4,691,341 A | 9/1987 | Knoble et al. |

(Continued)

FOREIGN PATENT DOCUMENTS

| WO | WO20/79890 | 10/2002 |
| WO | WO-03/034570 | 4/2003 |

OTHER PUBLICATIONS

Wen, "Wireless Sensor and Actuator Networks for Lighting Energy Efficiency and User Satisfaction" University of California, Berkeley Dissertation, 2008, 278 pgs (Year: 2008).*

(Continued)

*Primary Examiner* — Emilio J Saavedra
(74) *Attorney, Agent, or Firm* — Michael Best & Friedrich LLP

(57) ABSTRACT

System and method provide wireless distributed lighting control systems implementing a secure peer-to-peer, self-organizing and self-healing mesh network of actuators and system inputs. The system and method can be designed specifically for indoor and outdoor lighting where actuators include in-fixture, on-fixture and circuit control modules with ON/OFF and full range dimming capabilities, and system inputs include occupancy/vacancy sensors, daylight sensors and switches. A unique messaging protocol facilitates wireless and wired communication between actuators and system inputs, and provides web-based commissioning and monitoring of the lighting control system using a wireless access point accessible from a local network or (Continued)

Internet which can provide an intuitive and easy to use Graphical User Interface (GUI).

28 Claims, 15 Drawing Sheets

Related U.S. Application Data

(60) Provisional application No. 61/415,721, filed on Nov. 19, 2010, provisional application No. 61/527,058, filed on Aug. 24, 2011.

(56) References Cited

U.S. PATENT DOCUMENTS

| | | |
|---|---|---|
| 4,924,151 A | 5/1990 | Daleo et al. |
| 4,937,718 A | 6/1990 | Murray |
| 5,289,365 A | 2/1994 | Caldwell |
| 5,357,170 A | 10/1994 | Luchaco et al. |
| 5,402,040 A | 3/1995 | Sprout |
| 5,406,173 A | 4/1995 | Mix et al. |
| 5,438,239 A | 8/1995 | Nilssen |
| 5,446,342 A | 8/1995 | Nilssen |
| 5,455,487 A | 10/1995 | Mix et al. |
| 5,471,119 A | 11/1995 | Ranganath et al. |
| 5,623,186 A | 4/1997 | Archdekin |
| 5,637,964 A | 6/1997 | Hakkarainen et al. |
| 5,742,131 A | 4/1998 | Sprout et al. |
| 5,747,798 A | 5/1998 | Smith |
| 5,949,200 A | 9/1999 | Ference et al. |
| 5,962,989 A | 10/1999 | Baker |
| 5,977,717 A | 11/1999 | Dean |
| 6,028,396 A | 2/2000 | Morrissey, Jr. et al. |
| 6,028,522 A | 2/2000 | Petite |
| 6,046,550 A | 4/2000 | Ference et al. |
| 6,107,755 A | 8/2000 | Katyl et al. |
| 6,122,603 A | 9/2000 | Budike, Jr. |
| 6,181,086 B1 | 1/2001 | Katyl et al. |
| 6,188,177 B1 | 2/2001 | Adamson et al. |
| 6,218,788 B1 | 4/2001 | Chen et al. |
| 6,218,953 B1 | 4/2001 | Petite |
| 6,222,322 B1 | 4/2001 | Stack |
| 6,252,358 B1 | 6/2001 | Xydis et al. |
| 6,300,727 B1 | 10/2001 | Bryde et al. |
| 6,311,105 B1 | 10/2001 | Budike |
| 6,339,298 B1 | 1/2002 | Chen |
| 6,340,864 B1 | 1/2002 | Wacyk |
| 6,388,396 B1 | 5/2002 | Katyl et al. |
| 6,388,399 B1 | 5/2002 | Eckel et al. |
| 6,430,268 B1 | 8/2002 | Connor |
| 6,437,692 B1 | 8/2002 | Petite et al. |
| 6,538,568 B2 | 3/2003 | Conley, III |
| 6,555,966 B2 | 4/2003 | Pitigoi-Aron |
| 6,583,573 B2 | 6/2003 | Bierman |
| 6,636,005 B2 | 10/2003 | Wacyk et al. |
| 6,686,705 B2 | 2/2004 | Nerone et al. |
| 6,707,263 B1 | 3/2004 | Prasad |
| 6,731,080 B2 | 5/2004 | Flory |
| 6,813,525 B2 | 11/2004 | Reid et al. |
| 6,841,944 B2 | 1/2005 | Morrissey et al. |
| 6,864,642 B2 | 3/2005 | Nemirow et al. |
| 6,891,838 B1 | 3/2005 | Petite et al. |
| 6,888,323 B1 | 5/2005 | Null et al. |
| 6,904,385 B1 | 6/2005 | Budike, Jr. |
| 6,914,893 B2 | 7/2005 | Petite |
| 6,927,547 B2 | 8/2005 | Walko, Jr. et al. |
| 6,970,751 B2 | 11/2005 | Gonzales et al. |
| 6,979,955 B2 | 12/2005 | Roach et al. |
| 6,990,394 B2 | 1/2006 | Pasternak |
| 7,067,992 B2 | 6/2006 | Leong et al. |
| 7,081,715 B1 | 7/2006 | Goldstein |
| 7,084,574 B2 | 8/2006 | Roach et al. |
| 7,103,511 B2 | 9/2006 | Petite |
| 7,120,560 B2 | 10/2006 | Williams et al. |
| 7,122,976 B1 | 10/2006 | Null et al. |
| 7,126,291 B2 | 10/2006 | Kruse et al. |
| 7,167,777 B2 | 1/2007 | Budike, Jr. |
| 7,190,126 B1 | 3/2007 | Paton |
| 7,211,968 B2 | 5/2007 | Adamson et al. |
| 7,215,088 B1 | 5/2007 | Clark et al. |
| 7,221,110 B2 | 5/2007 | Sears et al. |
| 7,222,111 B1 | 5/2007 | Budike, Jr. |
| 7,307,542 B1 | 12/2007 | Chandler et al. |
| 7,333,903 B2 | 2/2008 | Walters et al. |
| 7,346,433 B2 | 3/2008 | Budike |
| 7,369,060 B2 | 5/2008 | Veskovic et al. |
| 7,391,297 B2 | 6/2008 | Cash et al. |
| 7,405,524 B2 | 7/2008 | Null et al. |
| 7,436,132 B1 | 10/2008 | Null |
| 7,446,671 B2 | 11/2008 | Giannopoulos et al. |
| 7,468,661 B2 | 12/2008 | Petite et al. |
| 7,507,001 B2 | 3/2009 | Kit |
| 7,514,884 B2 | 4/2009 | Potucek et al. |
| 7,529,594 B2 | 5/2009 | Walters et al. |
| 7,546,167 B2 | 6/2009 | Walters et al. |
| 7,546,168 B2 | 6/2009 | Walters et al. |
| 7,585,087 B2 | 9/2009 | Gagne et al. |
| 7,603,184 B2 | 10/2009 | Walters et al. |
| 7,619,539 B2 | 11/2009 | Veskovic et al. |
| 7,623,042 B2 | 11/2009 | Huizenga |
| 7,626,339 B2 | 12/2009 | Paton |
| 7,637,628 B2 | 12/2009 | Budike, Jr. |
| 7,671,544 B2 | 3/2010 | Clark et al. |
| 7,697,492 B2 | 4/2010 | Petite |
| 7,734,356 B2 | 6/2010 | Cleland et al. |
| 7,741,732 B2 | 6/2010 | Black et al. |
| 7,741,782 B2 | 6/2010 | Vermeulen et al. |
| 7,744,254 B2 | 6/2010 | Spiro |
| 7,756,556 B2 | 7/2010 | Patel et al. |
| 7,761,260 B2 | 7/2010 | Walters et al. |
| 7,764,162 B2 | 7/2010 | Cash et al. |
| 7,788,189 B2 | 8/2010 | Budike, Jr. |
| 7,791,492 B2 | 9/2010 | Nam et al. |
| 7,812,543 B2 | 10/2010 | Budike, Jr. |
| 7,834,555 B2 | 11/2010 | Cleland et al. |
| 7,870,080 B2 | 1/2011 | Budike, Jr. |
| 7,880,638 B2 | 2/2011 | Veskovic et al. |
| 7,911,359 B2 | 3/2011 | Walters et al. |
| 7,944,365 B2 | 5/2011 | Walters et al. |
| 7,978,059 B2 | 7/2011 | Petite et al. |
| 8,010,319 B2 | 8/2011 | Walters et al. |
| 8,138,435 B2 | 3/2012 | Patel et al. |
| 8,140,276 B2 | 3/2012 | Walters et al. |
| 8,148,854 B2 | 4/2012 | Shah et al. |
| 8,214,061 B2 | 7/2012 | Westrick, Jr. et al. |
| 8,227,731 B2 | 7/2012 | Hick et al. |
| 8,232,909 B2 | 7/2012 | Kroeger et al. |
| 8,271,937 B2 | 9/2012 | Anand et al. |
| 8,295,295 B2 | 10/2012 | Winter et al. |
| 8,296,488 B2 | 10/2012 | Westrick, Jr. et al. |
| 8,310,159 B2 | 11/2012 | Bigge et al. |
| 8,312,347 B2 | 11/2012 | Hick et al. |
| 8,340,834 B1 | 12/2012 | Walma et al. |
| 8,346,403 B2 | 1/2013 | Goyal et al. |
| 8,386,661 B2 | 2/2013 | Ostrovsky et al. |
| 8,410,922 B2 | 4/2013 | Null et al. |
| 2002/0080027 A1 | 6/2002 | William, III |
| 2003/0062841 A1 | 4/2003 | Norling |
| 2003/0090210 A1 | 5/2003 | Bierman |
| 2003/0090889 A1 | 5/2003 | Wacyk et al. |
| 2003/0209999 A1 | 11/2003 | Hui et al. |
| 2004/0061454 A1 | 4/2004 | Prasad |
| 2004/0122930 A1 | 6/2004 | Pasternak |
| 2004/0124786 A1 | 7/2004 | Morrissey, Jr. et al. |
| 2004/0232851 A1 | 11/2004 | Peter, Jr. |
| 2005/0003774 A1 | 1/2005 | Austman et al. |
| 2005/0179404 A1 | 8/2005 | Veskovic |
| 2005/0232289 A1 | 10/2005 | Walko, Jr. et al. |
| 2005/0248300 A1 | 11/2005 | Walko, Jr. et al. |
| 2006/0044152 A1 | 3/2006 | Wang |
| 2006/0155423 A1 | 7/2006 | Budike, Jr. |
| 2006/0202851 A1 | 9/2006 | Cash et al. |
| 2006/0212345 A1 | 9/2006 | Huizenga |
| 2007/0013475 A1 | 1/2007 | Hardwick |

(56) References Cited

U.S. PATENT DOCUMENTS

| | | |
|---|---|---|
| 2007/0041381 A1* | 2/2007 | Wakai .................. H04L 67/125 370/392 |
| 2007/0145826 A1 | 6/2007 | Clark et al. |
| 2007/0164681 A1 | 7/2007 | Gagne et al. |
| 2007/0183133 A1 | 8/2007 | Buij et al. |
| 2007/0228999 A1 | 10/2007 | Kit |
| 2007/0239477 A1 | 10/2007 | Budike, Jr. |
| 2007/0273307 A1 | 11/2007 | Westrick et al. |
| 2007/0273539 A1 | 11/2007 | Gananathan |
| 2007/0285921 A1 | 12/2007 | Zulim et al. |
| 2008/0058964 A1 | 3/2008 | Nickerson et al. |
| 2008/0061668 A1 | 3/2008 | Spiro |
| 2008/0067959 A1 | 3/2008 | Black et al. |
| 2008/0074059 A1 | 3/2008 | Ahmed |
| 2008/0084270 A1 | 4/2008 | Cash et al. |
| 2008/0097782 A1 | 4/2008 | Budike, Jr. |
| 2008/0111498 A1 | 5/2008 | Budike, Jr. |
| 2008/0185977 A1 | 8/2008 | Veskovic et al. |
| 2008/0197790 A1 | 8/2008 | Mangiaracina et al. |
| 2008/0211427 A1 | 9/2008 | Budde et al. |
| 2008/0276154 A1 | 11/2008 | Hick et al. |
| 2008/0317475 A1 | 12/2008 | Pederson et al. |
| 2009/0001893 A1 | 1/2009 | Cleland et al. |
| 2009/0066258 A1 | 3/2009 | Cleland et al. |
| 2009/0178472 A1 | 11/2009 | Mills et al. |
| 2009/0278479 A1* | 11/2009 | Platner .................. H05B 47/105 315/312 |
| 2009/0302782 A1 | 12/2009 | Smith |
| 2009/0315485 A1 | 12/2009 | Verfuerth et al. |
| 2009/0322232 A1 | 12/2009 | Lin |
| 2009/0322250 A1 | 12/2009 | Zulim et al. |
| 2010/0001652 A1 | 1/2010 | Damselth |
| 2010/0007289 A1 | 1/2010 | Budike, Jr. |
| 2010/0029268 A1 | 2/2010 | Myer et al. |
| 2010/0067227 A1 | 3/2010 | Budike, Jr. |
| 2010/0274945 A1 | 10/2010 | Westrick, Jr. et al. |
| 2010/0280677 A1 | 11/2010 | Budike, Jr. |
| 2011/0068900 A1* | 3/2011 | Billig .................. H04L 61/609 340/9.1 |
| 2011/0134649 A1 | 6/2011 | Becker et al. |
| 2011/0180687 A1 | 7/2011 | Rains, Jr. et al. |
| 2011/0288658 A1 | 11/2011 | Walters et al. |
| 2012/0147705 A1 | 6/2012 | Hick |
| 2012/0153840 A1 | 6/2012 | Dahlen et al. |
| 2012/0189298 A1 | 7/2012 | Ohad et al. |
| 2012/0313588 A1 | 12/2012 | Carberry et al. |

OTHER PUBLICATIONS

Wen, "Wireless Sensor and Actuator Networks for Lighting Efficiency and User Satisfaction" University of California, Berkeley Dissertation, 2008, 278 pgs.

* cited by examiner

CONTROL SYSTEM AND METHOD FOR MANAGING WIRELESS AND WIRED COMPONENTS

CROSS-REFERENCE TO RELATED APPLICATION

The present application is a continuation of, and claims the benefit of the filing date of co-pending U.S. patent application Ser. No. 13/299,266, filed Nov. 17, 2011, which claims benefit under 35 U.S.C. § 119(e) of U.S. provisional patent application Ser. No. 61/415,721 filed Nov. 19, 2010, and Ser. No. 61/527,058 filed Aug. 24, 2011, the disclosures of both of which (including all attachments filed therewith on Nov. 19, 2010 and Aug. 24, 2011, respectively) are hereby incorporated by reference in their entirety.

BACKGROUND OF THE INVENTION

1. Field of the Invention

The invention is in the field of wireless and wired lighting control systems. Generally, the system provides a solution for wirelessly controlling indoor and/or outdoor lighting luminaires or fixtures. The system includes wireless devices that receive signals from various sensors and other control devices and respond by taking appropriate action to control, for example, the light output of light fixtures. These wireless devices communicate with each other via a radio module (RM) embedded in each device. A controlling user interface (UI) can be deployed to monitor and control the system's wireless devices via web-based communication provided by a web server module that can communicate wirelessly with the system's wireless devices. The UI can include web pages that reside on a web server accessible by a standard web browser. Such a web browser can run on one or more computers connected to the web server. Connection to the web server can be wireless or wired through, for example: (1) a local area network, or (2) the internet by, for example, local or remote access to the internet, or (3) both.

2. Discussion of the Background of the Invention

The use of wireless control is one of the most exciting frontiers in lighting control, offering significant potential benefits over traditional wired solutions for both existing buildings and new construction. In a typical wired lighting controls system, control signals are sent (either one-way or both ways) using low-voltage communications wires. In a wireless system, devices communicate through the air utilizing radio frequency (RF) waves without the need for communications wiring. Wireless solutions substantially reduce the installed cost of lighting controls by negating the need for expensive dedicated control communications wiring.

Over the past decade, major advancements have been made that have significantly enhanced the capability and reliability of RF communications of all kinds. These advancements have made it feasible for control manufacturers to economically deploy RF wireless control strategies to overcome barriers related to hardwired control systems.

Use of RF wireless controls for both residential and commercial applications continues to grow. It is generally accepted that with the new technologies now available, RF wireless controls will become more widely adopted in commercial applications.

As the cost of energy continues to escalate, the value of highly tuned and capable lighting solutions, which capitalize on both energy efficient lighting fixtures and aggressive energy saving control strategies, will continue to grow. The use of RF wireless control strategies will enable deployment of control strategies not possible or economically prohibitive using traditional wired control techniques.

There are various conventional systems and methods for monitoring and controlling remote wireless communication devices including sensors or actuators employed in the lighting industry. Such conventional wireless communication devices are described in, for example, U.S. Pat. Nos. 7,870,080, 7,167,777, 7,346,433, and 7,812,543, and U.S. Published Patent Applications Pub. Nos. 2008/0097782, 2010/0007289, 2010/0280677, and 2010/0301781.

There are numerous examples of conventional systems where laptop computers, servers or workstations connected to the Internet or an intranet (such as a wide area network, a local area network or a series of linked, local networks) control remote wireless devices by means of local gateways that broadcast commands to remote wireless devices. Such conventional systems and methods are described in, for example, U.S. Pat. Nos. 6,028,522, 6,218,953, 6,430,268, 6,437,692, 6,891,838, 6,914,893, 7,053,767, 7,103,511, 7,468,661, 7,650,425, 7,697,492, 7,978,059, and U.S. Published Patent Applications Pub. Nos. 2005/0201397, 2009/0243840, 2010/0194582, and 2010/0312881.

Typically, wireless communications in these conventional systems are achieved by local gateways designed to "broadcast" commands to wireless devices, and by wireless devices that "broadcast" responses or other information. When "broadcast," the information is transmitted or re-transmitted indiscriminately to all wireless devices within the range of the broadcast. Thus, such wireless communications employ conventional protocols and message formats where all wireless transmissions (such as commands or responses) include fields identifying a wireless device that the message is addressed "To," the wireless device the message is addressed "From," and the content of the message.

That is, without the "From" information, data contained in a broadcast response cannot be matched to the wireless device actually providing the data. Accordingly, in conventional systems, responses broadcast from a wireless device (by either direct transmission to a local gateway, or re-transmission by other wireless devices in the network) must include the wireless device's "From" information.

Drawbacks of such conventional communication protocols and message formats include: (1) a longer message structure, which may result in greater likelihood of transmission errors in a wireless communication; (2) a more complicated communication protocol, which may require mapping of communication paths between local gateways and wireless devices to ensure efficient delivery of commands and responses; (3) need for additional processing capability in wireless devices to ensure proper transmission and re-transmission of responses, which may increase the cost of deploying and maintaining the system; and (4) limited capability to associate sensors with actuators, which inhibits flexibility to deploy and commission wireless devices, sensors or actuators to monitor and control lighting in selectively defined locations within a three-dimensional space or volume.

SUMMARY OF THE INVENTION

Exemplary embodiments of the present invention address at least the above problems and/or disadvantages and provide at least the advantages described below.

An exemplary embodiment of the present invention provides a lighting control system including a wireless, distributed, secure, peer-to-peer, self organizing and self healing mesh network of actuators, which include fixture control modules, and system inputs, which include occupancy/vacancy sensors, daylight sensors and switch stations.

According to an exemplary implementation of an embodiment of the present invention, the system provides control for indoor and outdoor lighting applications.

An exemplary implementation of an embodiment of the present invention provides a system capable of turning lighting loads on/off as well as full range dimming of dimmable lighting loads.

In another exemplary implementation of an embodiment of the present invention, a system provides plug and play support for occupancy sensors, daylight sensors and switch stations. An exemplary system will automatically and intelligently respond to connected devices to provide the most energy efficient operation.

In yet another exemplary implementation of an embodiment of the present invention, a system is accessible remotely from a local network or the Internet using any standard Internet browser. An exemplary system does not require any special client side computer software to be installed for accessibility.

An exemplary embodiment of the present invention provides a system including a luminaires for illuminating a space, actuators respectively associated with the luminaires to selectively control illumination output by the respective luminaires, input modules, each configured to process information associated with the space and to communicate results of their processing to the actuators, a wireless access point, and a controller. In an exemplary implementation, each of the input modules and actuators is associated with identifiers each indicative of a control perimeter within the space, each of the actuators controls illumination output by the respective luminaires based on the results of processing by those of the input modules associated with the same identifier as the actuators. In yet another exemplary implementation, the controller communicates via the access point with the actuators and input modules to associate identifiers with each of the actuators and input modules.

Yet another exemplary embodiment of the present invention provides a method for controlling lighting including configuring luminaires for illuminating a space, associating actuators with the luminaires, each of the actuators selectively controlling illumination output by at least one of said luminaires, configuring input modules to process information associated with the space and to communicate results of their processing to the actuators, associating input modules with identifiers indicative of a control perimeter within the space, associating the actuators with the identifiers, wirelessly communicating results of the processing by the input modules to actuators that have the same identifier as the input modules, respectively, and controlling illumination output of the luminaires associated with the actuators based on the wirelessly communicated results of the processing by the respective input modules.

In an exemplary implementation of certain embodiments of the present invention the space where the lighting is to be controlled is defined by a plurality of areas, each of the areas comprising a plurality of zones, each of the zones comprises a plurality of groups. Accordingly, control perimeters to facilitate flexible lighting control within the space can be associated with one of the areas, one of the zones, and at least one of the groups, and identifiers associated with system's input modules and actuators comprise information indicative of said one of the areas, said one of the zones, and said at least one of the groups.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
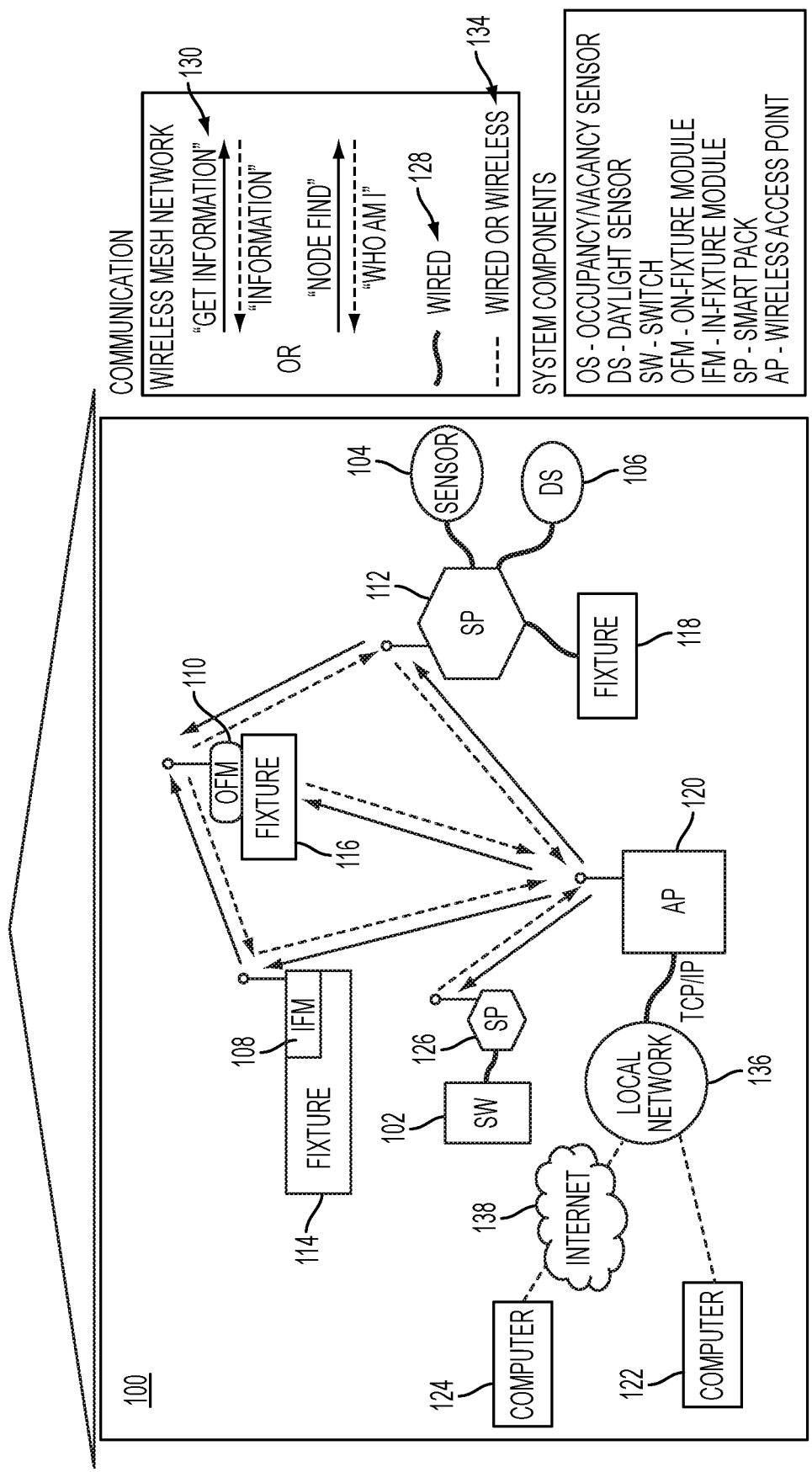
FIG. 1 is a diagrammatic representation of a system according to an exemplary embodiment of the present invention.

Referring now to the drawings, wherein like reference numerals designate identical or corresponding parts throughout the several views, embodiments of the present invention are shown in schematic detail.

The matters defined in the description such as a detailed construction and elements are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions or constructions are omitted for clarity and conciseness. Exemplary embodiments of the present invention are described below in the context of commercial application (e.g., office buildings, outdoor parking lots and parking garages). Such exemplary implementations are not intended to limit the scope of the present invention, which is defined in the appended claims.

Certain terms of art that may be used in the description have commonly accepted definitions as noted below:

AES-128—Advanced Encryption Standard 128 bit encryption key
DHCP—Dynamic Host Configuration Protocol
DNS—Domain Name Server
FCC—Federal Communications Commission
HTTPS—Hypertext Transfer Protocol Secure
IC—Industry Canada
ISM Band—Industrial, Scientific and Medical radio frequency band
MAC—Media Access Control
RF—Radio Frequency
SNAP—Synapse Network Appliance Protocol
SPST—Single Pole, Single Throw
SSL—Secure Sockets Layer
TCP/IP—Transmission Control Protocol/Internet Protocol An exemplary embodiment of the present invention provides a system comprising wireless, distributed and intelligent lighting control devices including but not limited to control modules with ON/OFF and full range dimming capabilities, and system input devices including but not limited to occupancy/vacancy sensors, daylight sensors and manual switch stations.

FIG. 1 illustrates an example of a wireless lighting system 100 configured according to an embodiment of the present invention to includes light fixtures 114, 116, 118 and actuators 108, 110, 112 that respectively control light output by theses fixtures to illuminate a certain three dimensional space, or volume, such as in a building or a parking lot, or both. System 100 also includes input modules 102, 104 and 106 that provide information about the space. As illustrated in the example of FIG. 1, actuators 108, 110 and 112 communicate wirelessly with each other, and can wirelessly receive information about the space from any one of the input modules 102, 104 and 106 using a messaging protocol according to an exemplary embodiment of the present invention to produce desired light level output from the light fixtures 114, 116 and 118 based on properly routed and received information from input modules 102, 104 and 106.

As further illustrated in FIG. 1, a controlling user interface (UI) can be deployed on one or more computers 122, 124 to monitor and control the system's wireless devices via web-based communication provided by a web server module 120 that can communicate wirelessly with the system's wireless devices 108, 110, 112 and 126 (as well as modules 102, 104 and 106 by virtue of their connection to wireless devices 126 and 112, respectively). The UI can include web pages that reside on a web server accessible by a standard web browser. Such a web browser can run on one or more computers connected to the web server wirelessly or by wire thorough, for example: (1) a local area network 136, or (2) the Internet 128 by, for example, local or remote access to the Internet, or (3) both.

Figure 17:
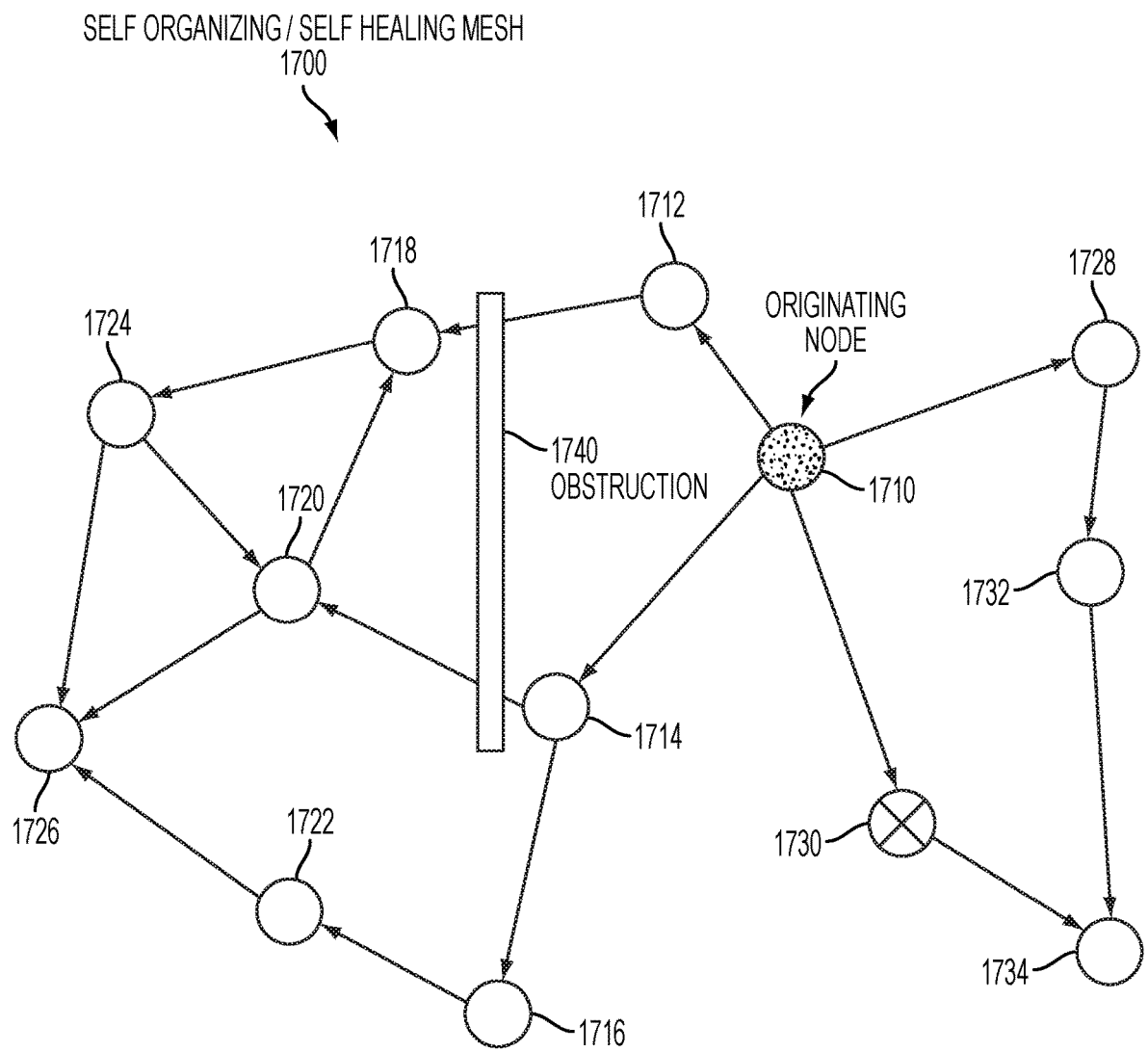
FIG. 17 is a graphical representation of communication in a self-organizing, self-healing mesh network that may be utilized in an exemplary embodiment of a system according to the present invention.

A system according to an exemplary implementation of the present invention has an architecture that utilizes SNAP to create a peer-to-peer, self-organizing and self-healing mesh network infrastructure where wireless devices form nodes of the mesh network. Such a system does not require a master controller/coordinator or master node devices for proper system operation. Instead, all nodes are capable of communicating with each other without the need of such single point of failure devices. This allows efficient setup and communication over fairly wide areas without the need for high powered wireless transmitters since the mesh nodes receive and retransmit messages As illustrated in the example of FIG. 17, in a mesh network 1700 all nodes 1710, 1712, ... 1734 act as repeaters forwarding messages not for them on to nodes that may be out of range of the node that sent a message. By this method, a message propagates outward from the source (for example, from originating node 1710) and then from node to node until the destination (for example, nodes 1726 and 1734) is reached even in view of obstructions 1740 preventing direct node-to-node communications, or disabled nodes 1730. In an exemplary implementation, messages have a "life counter" which is decremented after each mesh hop to eventually stop retransmission and thus cut down on network traffic.

In the exemplary implementation of a self-organizing system, the mesh network of devices can be built automatically without the need to manually set device addresses via dials, DIP switches or other means. An exemplary implementation of s self-healing system provides system devices within the mesh network that automatically reroute messages around a failed device (see, for example FIG. 17, which illustrates rerouting around failed node 1730) to ensure message delivery.

In an exemplary embodiment of a system according to the present invention, the system's architecture facilitates data transmission between wireless devices over the 900 MHz (902 MHz-928 MHz) ISM RF band with a supported RF range of, for example, 300 ft. between wireless devices. Such a system may use, for example, SNAP communication protocol to transmit/receive and negotiate messaging among wireless devices. The system may also utilize, for example, spread spectrum frequency hopping to facilitate robust communication and prevent the unauthorized interception of messages over the air and to comply with FCC requirements.

In an exemplary implementation, a system according to an embodiment of the present invention can secure all messages. For example, when transmitting over the air, each wireless device of the system can use AES-128 security cipher to encrypt and decrypt messages. A secure HTTPS/SSL protocol may be used when, for example, users access the system via an Internet browser.

In an exemplary embodiment of the present invention as described in more detail below, a system includes input devices deployed in a three-dimensional space or volume to monitor and communicate changes such as occupancy, daylight levels and manual switch input. To implement lighting control strategies, exemplary system architecture facilitates the association of such system's input devices to the system's control modules, which may include actuators to control, for example, lighting within the space.

According to yet another exemplary implementation, a system is configured for accessed from a local network or the Internet using any standard Internet browser and includes a Graphical User Interface (GUI) to configure, control, monitor and/or schedule individual devices or groups of devices of the system. System devices may also be capable of having their firmware updated or upgraded over the air, i.e., wirelessly via RF.

A wireless lighting control system 100 according to an exemplary embodiment of the present invention as illustrated in a block diagram of FIG. 1 can include a wireless mesh network of sensors and actuators designed specifically for lighting control applications. Sensors can include switches 102, occupancy/vacancy sensors 104 and daylight sensors 106. Actuators can include wireless devices such as in-fixture module (IFM) 108, on-fixture module (OFM) 110 and "smart" power packs (SP) 112 with On/Off control and/or dimming capabilities, where dimming can be implemented by, for example, 0 to 10 variable DC voltage (VDC) control. In the example of FIG. 1, wireless devices 108, 110 and 112 can be respectively associated with, and control, fixtures 114, 116 and 118.

In the example of FIG. 1, system 100 components can communicate by wireless connectivity 128 via a Radio Frequency (RF), or by wired connectivity 130. The wireless connectivity 128 provides communication among system 100 wireless devices, and can be implemented as a peer-to-peer, self-healing mesh network. On the other hand, the wired connectivity 130 provides communication with system 100 sensors, and can be implemented as a, for example topology-free or fixed-topology, bus where any one of the wireless device (for example, SP 112 of FIG. 1) can have one or more receptacles to allow easy interconnection with one or more sensors (for example, sensor 104 and/or DS 106 of FIG. 1) via industry standard connectors.

In an exemplary embodiment of the present invention, system 100 has a wireless server module including AP 120 to facilitate web-based commissioning and monitoring of system 100, particularly its actuators and sensors. As illustrated in the example of FIG. 1, a controlling UI can be deployed to monitor and control the system's wireless devices via the web-based communication facilitated by the AP 120 that can communicate wirelessly with the system's wireless devices and connects via a TCP/IP to a server in a local area network 128.

The UI can include web pages that reside on a web server accessible by a standard web browser. Such a web browser can run on one or more computers 122 and/or 124 connected to the web server. Connection to the web server can be wired or wireless communication 134 through, for example: (1) a local area network 136, or (2) the Internet 138 by, for example, local or remote access to the Internet, or (3) both.

Figure 2:
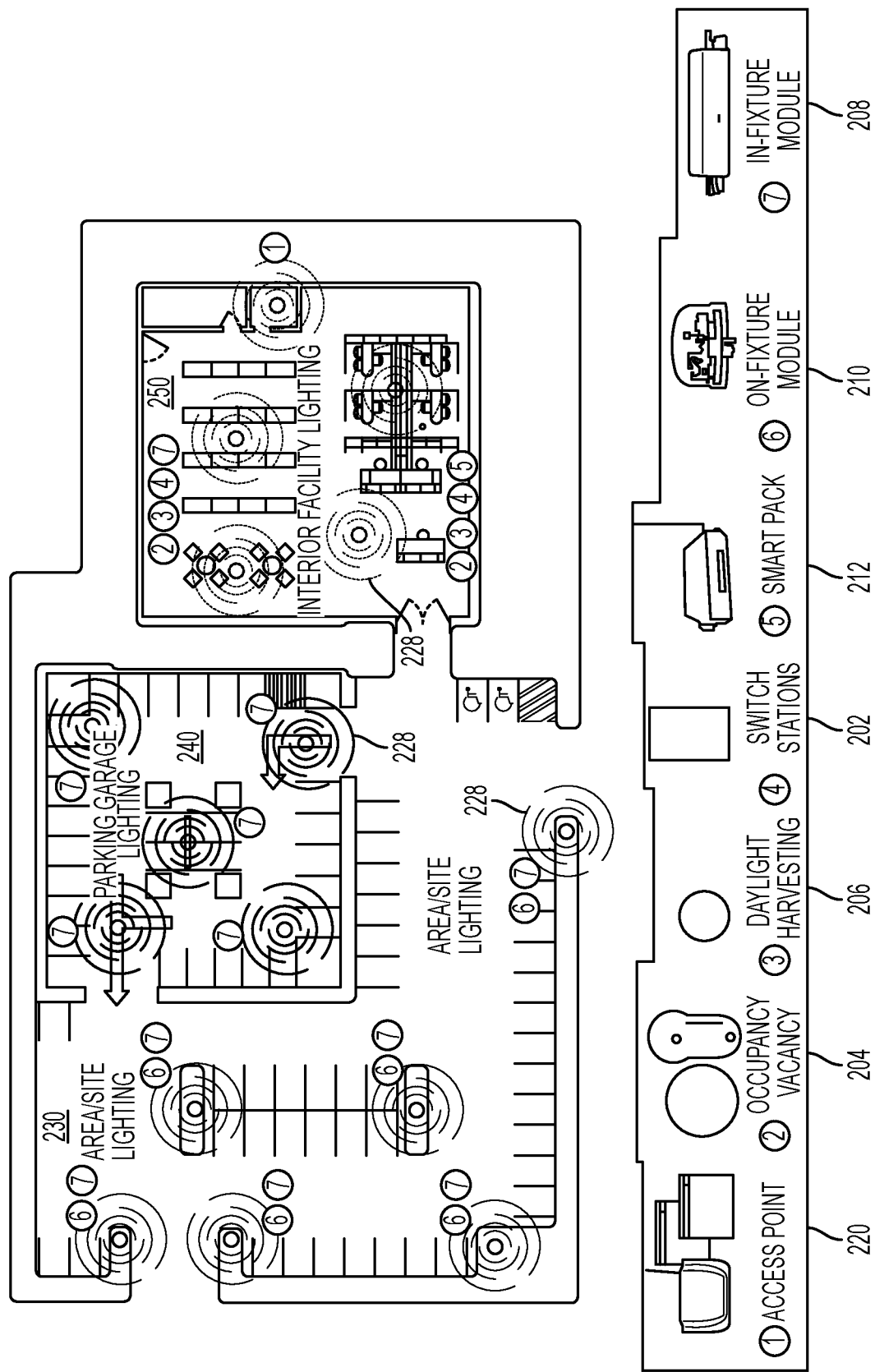
FIG. 2 is a top plan diagram of an exemplary facility implementing a lighting system according to an exemplary embodiment of the present invention.

As illustrated in FIG. 2, according to an exemplary embodiment of the present invention, a lighting control system 200 comprises (1) actuators, which include IFMs 208, OFMs 210 and SPs 212, and (2) sensors, which include switches 202, occupancy/vacancy sensors 204, and daylight sensors 206. The system also provides wireless access to its actuators and sensors via AP 220, for scheduling and data harvesting by means of web-based control devices (see FIG. 1 illustrating computer 122 and 124 in communication with AP 120 connected to local area network 136).

Sensors 204 and 206 can be deployed within a space, such as inside a building, to monitor changes such as occupancy/vacancy or daylight in certain portions of the space or the entire space as desired and based on, for example, size and configuration of the space, as well as, for example, range and/or sensitivity of the sensors. In an exemplary implementation, sensors can also receive input from users to set their operational parameters such as sensitivity or timing as described in, for example, U.S. Pat. Nos. 5,640,143 and 5,699,243, the entire disclosures of both of these patents being incorporated herein by reference. In an exemplary implementation, the function of these sensors is to monitor a portion or all of the space for changes and communicate the changes they perceive over the system's wireless mesh network.

According to an exemplary implementation, the sensors are not responsible for the implementation of the system's lighting control strategy, and the control strategies are the responsibility of the actuators including wireless devices 108, 110 or 112.

According to an exemplary embodiment of the present invention, sensors of a wireless lighting control system are associated with actuators using an area/zone/group assignment strategy which can be indicative of, for example, a three-dimensional control perimeter within a three-dimensional space or volume. That is, actuators that are assigned to a certain control perimeter(s) (as defined by the area/zone/group assignment) use information only from those sensors programmed to participate in the same control perimeter(s) (as defined by the area/zone/group assignment).

For example, a system implementing such assignment strategy can be deployed in a facility or building comprising a plurality of areas, zones and groups. An advantageous, non-limiting exemplary implementation may define one facility/64 areas/64 zones/16 groups. Each sensor and actuator may be programmed to participate in only one area and zone. On the other hand, each sensor or actuator may be assigned to one or all of the available groups within the area/zone.

For example, a facility may constitute a building, an area may be defined as a floor of the building, a zone may be defined as one or more rooms or locations on the floor, and a group controls the assignments of sensors and actuators within the zone.

Figure 3:
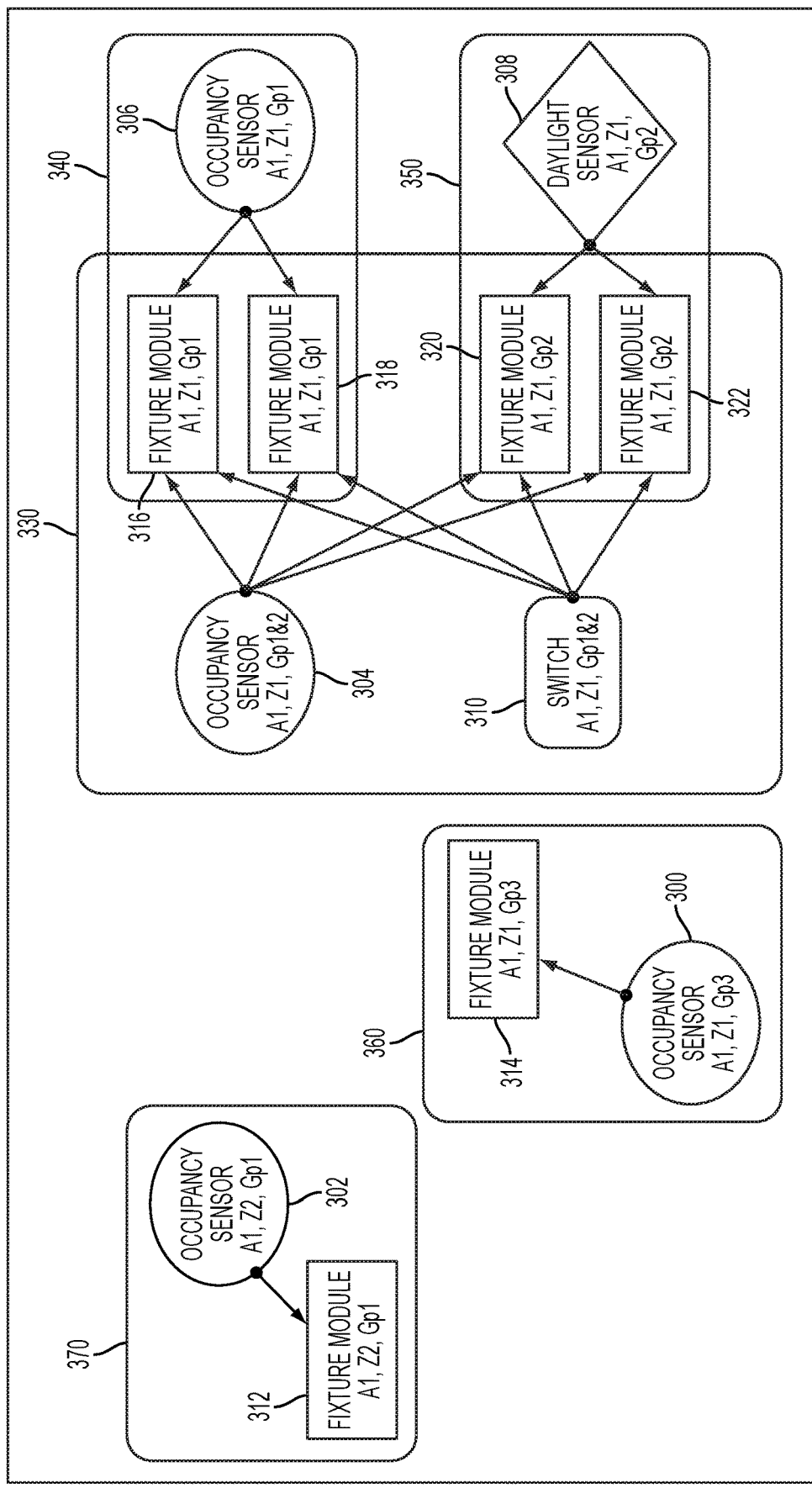
FIG. 3 is a graphical representation of a system configuration and communication protocol for system components according to an exemplary embodiment of the present invention.

FIG. 3 illustrates an example of sensors 300, 302, 304, 308, 308 and 310, and actuators (associated with respective fixtures) 312, 314, 316, 318, 320 and 322, deployed in an area/zone/group configuration according to an exemplary embodiment of the present invention. To visualize this concept, an "area" can be viewed as a method of separating buildings or floors, a "zone" as a method of separating individual rooms or locations of control, and a "group" as a method of configuring control assignments within the "zone." In the example of FIG. 2, the area/zone/group assignment of various control devices (i.e., sensors and fixture modules) can be summarized in the following table.

| Device | 300 | 302 | 304 | 306 | 308 | 310 | 312 | 314 | 316 | 318 | 320 | 322 |
|---|---|---|---|---|---|---|---|---|---|---|---|---|
| Area | 1 | 1 | 1 | 1 | 1 | 1 | 1 | 1 | 1 | 1 | 1 | 1 |
| Zone | 1 | 2 | 1 | 1 | 1 | 1 | 2 | 1 | 1 | 1 | 1 | 1 |
| Group | 3 | 1 | 1, 2 | 1 | 2 | 1, 2 | 1 | 3 | 1 | 1 | 2 | 2 |

In the example of FIG. 3, occupancy sensor 304 and switch 310 are programmed to participate in area 1, zone 1, and groups 1 and 2. Such programming can be achieved by, for example, an area/zone/group identifier, which can be considered to define a control perimeter 330 within a space 380, and can be included in messages communicated among the system's actuators and sensors according to an exemplary communication protocol (described in more detail later in this specification). Accordingly, in the example of FIG. 3, information from occupancy sensor 304 and switch 310 is communicated to: (1) control fixture modules 316 and 318 programmed to participate in area 1, zone 1, and group 1; and (2) control fixture modules 320 and 322 programmed to participate in area 1, zone 1, and group 2.

Fixture modules 316 and 318 also receive information from occupancy sensor 306 likewise programmed to participate in area 1, zone 1, and group 1 (control perimeter 340). On the other hand, fixture modules 320 and 322 also receive information from ambient light sensor 308 likewise programmed to participate in area 1, zone 1, and group 2 (control perimeter 350). Therefore, fixture modules 316 and 318 are programmed to actuate associated fixture lights based on information only from the two occupancy sensors 304 and 306, and a switch 310, while fixture modules 320 and 322 are programmed to actuate associated fixture lights based on information only from occupancy sensor 304, switch 310 and an ambient light sensor 308.

In an exemplary implementation of the embodiments of the present invention, fixture modules 320 and 322 can be programmed with an information processing algorithm. For example, in accordance with such an algorithm, fixture modules 320 and 322 actuate (turn on or off) associated lights based on a set of rules that take into account motion detected by sensor 304, light level sensed by sensor 308, and position of switch 310. An exemplary set of rules of an information processing algorithm programmed in fixture modules 320 and 322 may include the following: if motion is detected by sensor 304 turn the lights on, unless ambient light detected by sensor 308 is above a threshold level, then keep the light off, unless ON command is received from switch 310, then turn the lights on.

As further illustrated in the example of FIG. 3, two other control perimeters 360 and 370 are defined in space 380 by (1) area 1, zone 1, and group 3, and (2) area 1, zone 2, and group 1, respectively. As shown in FIG. 3, a control perimeter can comprise a single sensor and a single module: (1) control perimeter 360 includes fixture module 314 which receives information only from occupancy sensor 300, both programmed to participate in area 1, zone 1, and group 3; and (2) control perimeter 370 includes fixture module 312 which receives information only from occupancy sensor 302, both programmed to participate in area 1, zone 2, and group 1.

According to an exemplary implementation, area, zone and group assignments, as well as information processing algorithms, may be programmed directly into system sensors and actuators via a commissioning tool such as a computer.

The following is a detailed description of exemplary implementations of system actuators including OFMs, IFMs and SPs that can use SNAP to participate in a secure, peer-to-peer, self-organizing and self-healing mesh network and to transmit/receive and negotiate messaging between wireless devices using, for example, SNAP communication protocol.

On-Fixture Module (OFM)

Figure 4:
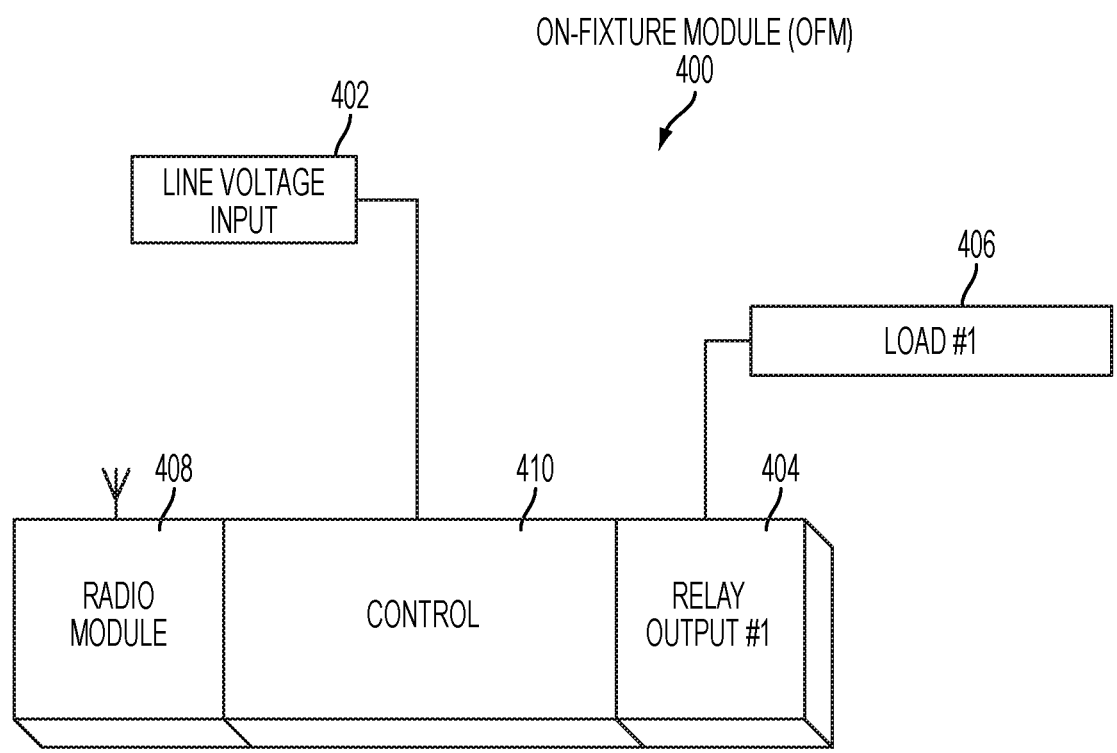
FIG. 4 is a block diagram of a system actuator constituted by an on-fixture module according to an exemplary embodiment of the present invention.

Referring to a block diagram of FIG. 4, according to an exemplary implementation, OFM 400 includes a radio module (RM) 408 to transmit and receive information wirelessly over, for example, a 900 MHz (902 MHz-928 MHz) ISM RF band within a supported RF range of, for example, 300 ft. between wireless devices.

An OFM 400 can, for example, mount to a conventional controlled outdoor lighting fixture 406 via a NEMA GTL receptacle interface commonly used for the connection of a twist-lock photocell controller. An exemplary implementation of an OFM 400 in a system according to an exemplary embodiment of the present invention supports universal input voltage 402 (120-347 VAC, 50/60 Hz) and includes, for example, a SPST relay 404 for On/Off control of a load 406. An OFM 400 can be compatible with incandescent, magnetic and electronic lighting loads 406 including LED drivers. In an exemplary implementation, OFM 400 implements zero arc point switching circuitry and programming in control block 410 of the type described in, for example, U.S. Pat. No. 5,821,642, the entire disclosure of which is incorporated herein by reference, to preserve contact life of relay 404.

Figure 5:
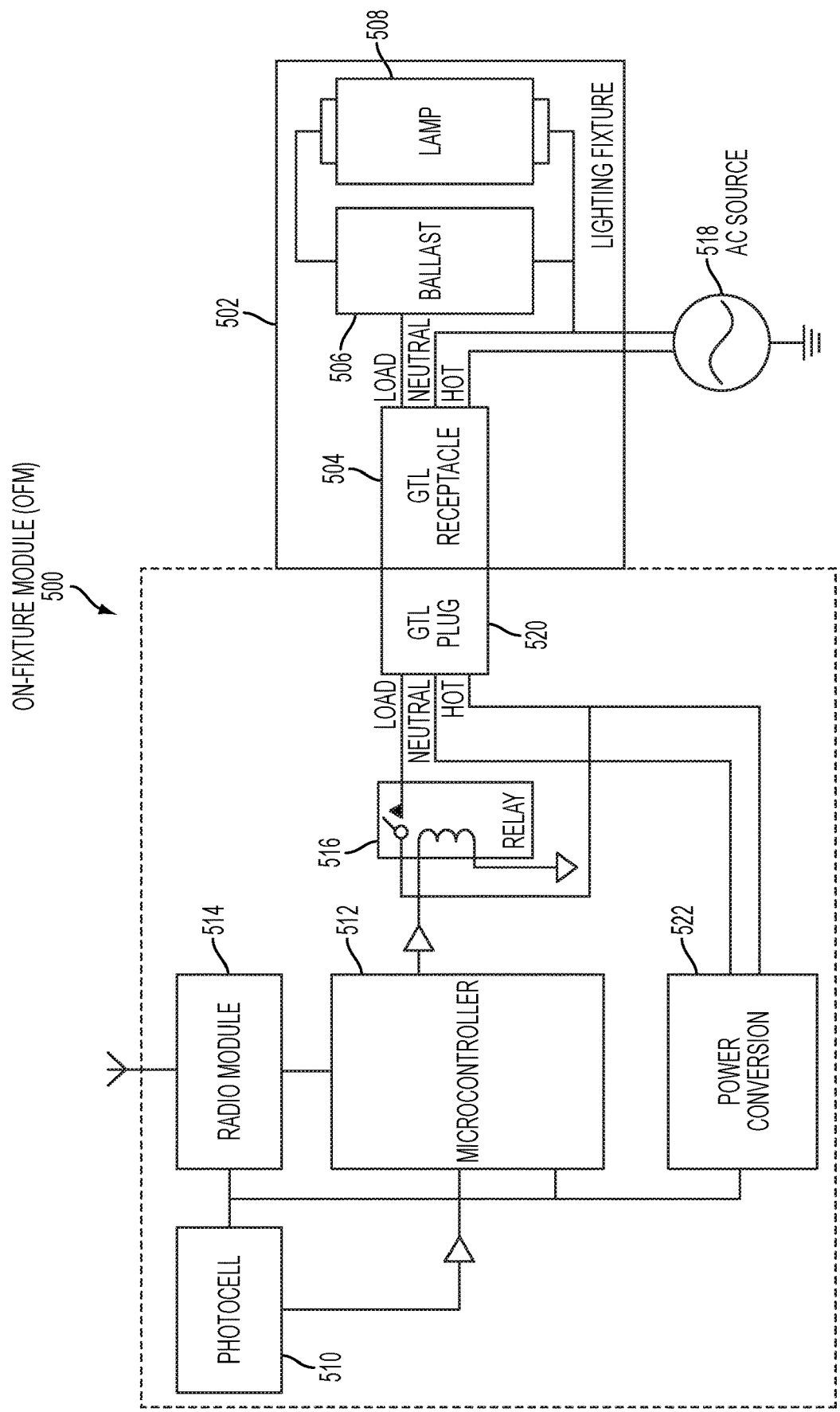
FIG. 5 is a more detailed block diagram of a system actuator constituted by an on-fixture module according to an exemplary embodiment of the present invention.

Referring to FIG. 5, in an exemplary implementation, an OFM 500 is designed with a GTL plug 520 to reside on the top of a light fixture 502, for example, a street light or parking lot light (typically called "cobra heads" in the industry), that has a built-in NEMA twist-lock GTL receptacle 504. The three-conductor receptacle 504 allows an inserted device 500 to control the on/off operation of the light 502, which in the example of FIG. 5 includes a ballast 506 powering lamp 508. In an advantageous embodiment, OFM 500 includes an integrated daylight sensor (constituted by photocell 510 and microcontroller 512, which among other tasks, processes photocell data to evaluate ambient light level). A translucent top housing of OFM 500 allows photocell 510 of the daylight sensor to receive ambient light.

An exemplary OFM 500 is a self-contained intelligent wireless control module that provides on/off lighting control for outdoor lighting fixture(s) 502 based on, for example, any one or combination of preloaded schedules programmed into microcontroller 512, RF commands via radio module 514, and/or the light available based on information from photo cell 510. OFM 500 can include an internal power conversion module 522 that provides low voltage power to, for example, microcontroller 512, photocell 510 and RM 514. In a system according to embodiments of the present invention, each OFM can be individually controlled or grouped with other wireless devices, and communicates via RF to other devices within the system's self-healing mesh network.

When attached to a fixture 502, the OFM 500 can provide the following exemplary non-limiting functionality.

1. On/off control of the fixture can be implemented using, for example, a relay 516 that closes to complete the power circuit or opens to interrupt the flow of current to the light fixture 502.
   a. The relay 516 can be controlled remotely via commands received by the RM 514 and interpreted by the embedded microcontroller 512.
   b. The relay 516 can be controlled locally by the embedded microprocessor 512 based on the interpretation of signals from, for example, a photocell 510 which is part of OFM 500. For example, the relay 516 can be commanded to close (turn on the light) when the natural, ambient light is below a specified level.
   c. The relay 516 can be controlled locally by the embedded microprocessor 512 based on, for example, schedules previously downloaded via the RM 514. These schedules can be generated by a user accessing a Web Server. For example, a schedule could be created that would turn the lights on Monday through Friday at 6:00 p.m. and off at 6:00 a.m.

2. Monitoring of the controlled fixture 502 for diagnostic and informational purpose is performed, for example, in OFM 500 containing sensors (not shown) that can measure current, voltage and temperature of the fixture being controlled.

a. For example, AC current from AC source 518 can be measured without attaching directly to the power line using a Hall Effect current sensor. The AC line passes through a piece of U-shaped ferrite material that concentrates the magnetic field of the conductor into the sensor. AC current information can be used to monitor energy usage and also as an indication of degrading lamp operation. As the lamps, e.g. 508, in the fixture 502 age, they consume more current. A rise in current consumption can be used as a remote indication that the lamp will need to be replaced soon.

d. AC voltage can be measured using, for example, the microcontroller's 512 analog to digital converter (not shown).

e. Temperature can be measured using an internal resistor network in, for example, the RM 514.

f. Both current and voltage zero crossings are detected by circuitry which is associated with, or a part of microcontroller 512. This information can be used to determine proper time to actuate the relay 512. It can also be used to determine the power factor of the controlled fixture load 502.

g. Various statistics relating to the operation of the fixture can be recorded and accumulated in the processor's 512 non-volatile memory. For example, total on time of the fixture is stored. This can be accessed remotely via, for example, the Web Server through the wireless link, making it unnecessary to travel to the physical location of the fixture to check its status. Maintenance can be scheduled based on this information.

In-Fixture Module (IFM)

Figure 6:
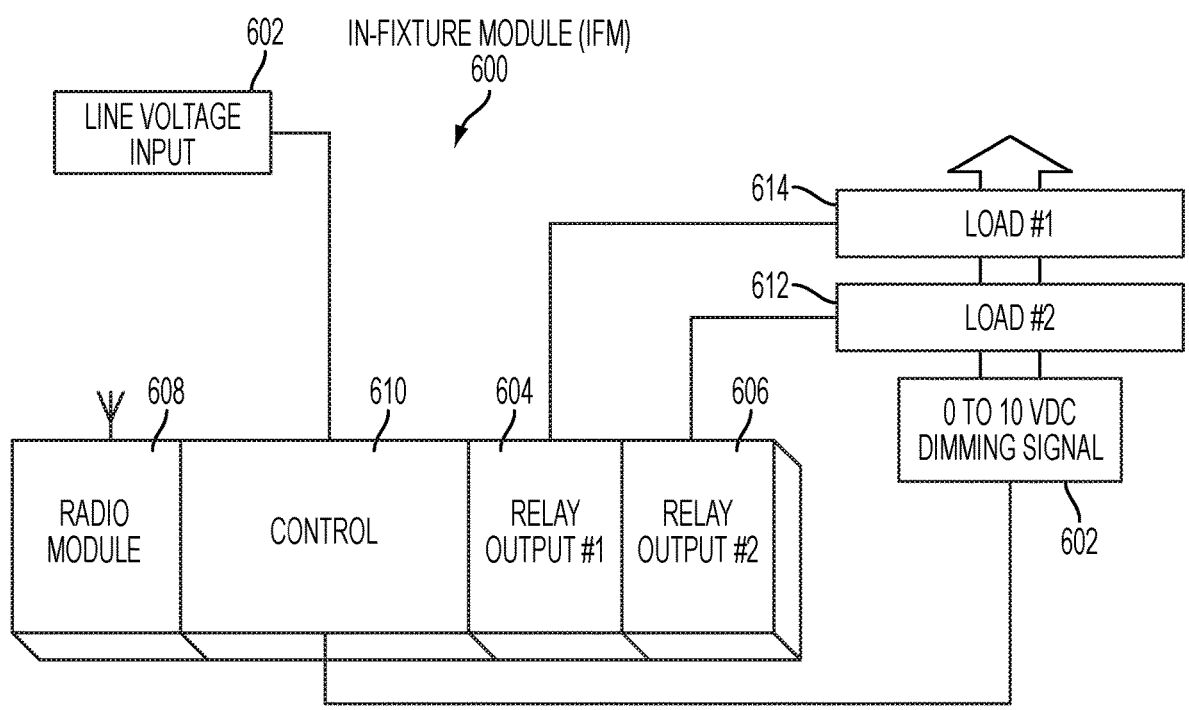
FIG. 6 is a block diagram of a system actuator constituted by an in-fixture module according to an exemplary embodiment of the present invention.

Referring to block diagram of FIG. 6, according to an exemplary implementation, IFM 600 shares much of the electrical and firmware design with an OFM 400 including, for example, control 610, an RM 608, a relay 604 that controls power to load 614, and line voltage input 602. On the other hand, IFM 600 can have a different physical form factor, lacks a photocell, adds dimming capabilities 602, and adds options for controlling a second relay 606 in addition to first relay 604 to control power to a second load 612. The IFM 600 can be housed in, for example, a rectangular plastic assembly, suited for installation in a fluorescent fixture ballast tray. It can also be installed in the body of an external lighting fixture that does not have a GTL receptacle. There are provisions for an external antenna connection via an industry standard RP-SMA connector.

Figure 7:
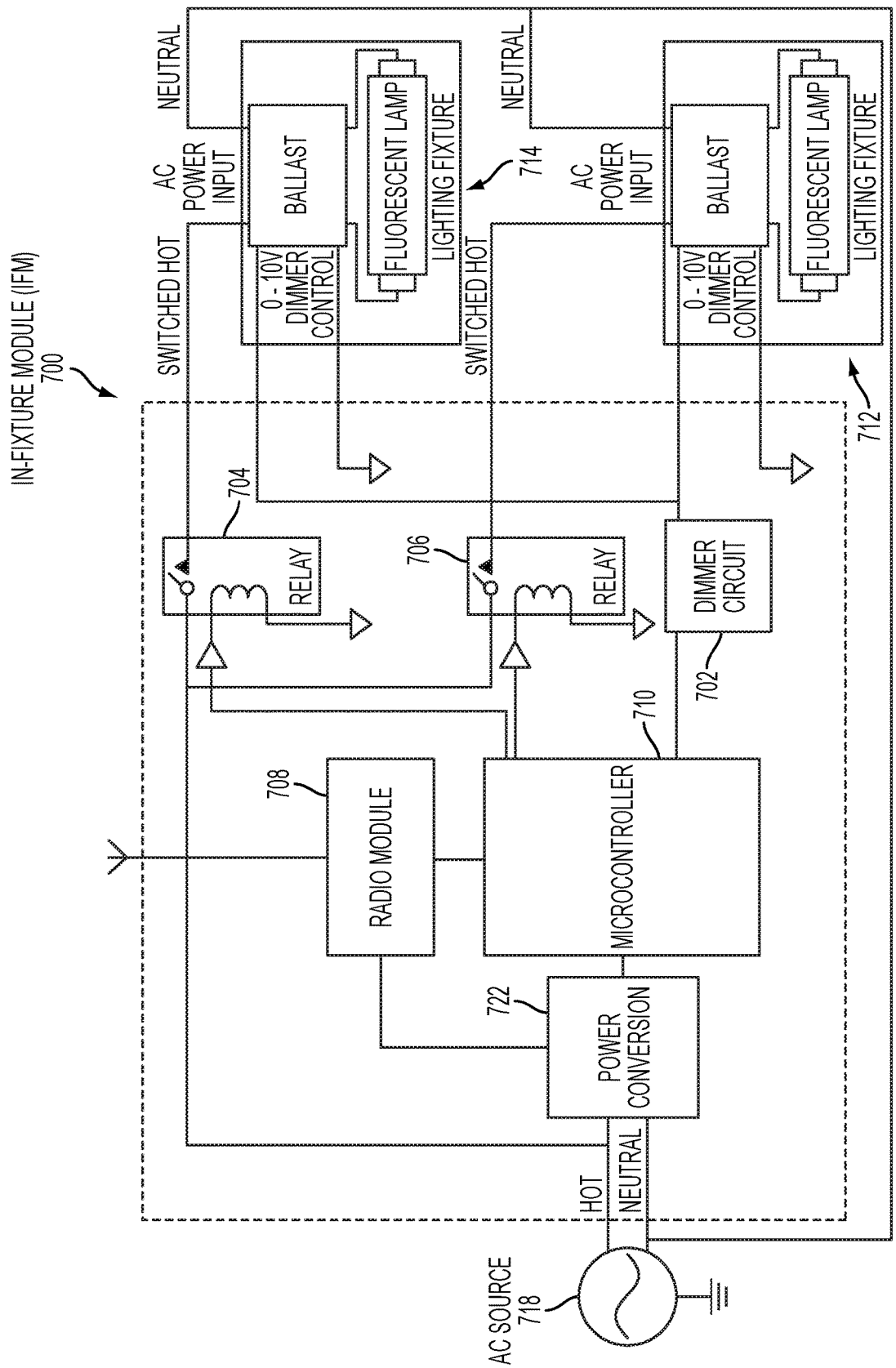
FIG. 7 is a more detailed block diagram of a system actuator constituted by an in-fixture module according to an exemplary embodiment of the present invention.

Referring to FIG. 7, IFM 700 is a self-contained intelligent wireless control module with either one or two independently controlled outputs via relays 740 and/or 706, and a dimming control output via dimmer circuit 702. Each IFM can control one or more fixtures 714 and/or 712, and can be individually controlled or grouped with other wireless devices. When attached to fixture 714 and/or 712, the IFM 700 can provide exemplary non-limiting functionality analogous to that of OFM 500 as descried above.

IFM 700 can communicate wirelessly via RM 708 with other devices within the system's wireless self-organizing and self-healing mesh network. IMF 700 includes, for example, a programmable microcontroller 710 powered by a power conversion module 722, which (as in the case of an OFM) converts high voltage from AC source 718 to a suitable DC voltage to power microcontroller 710 and RM 708.

Smart Pack (SP)

Figure 8:
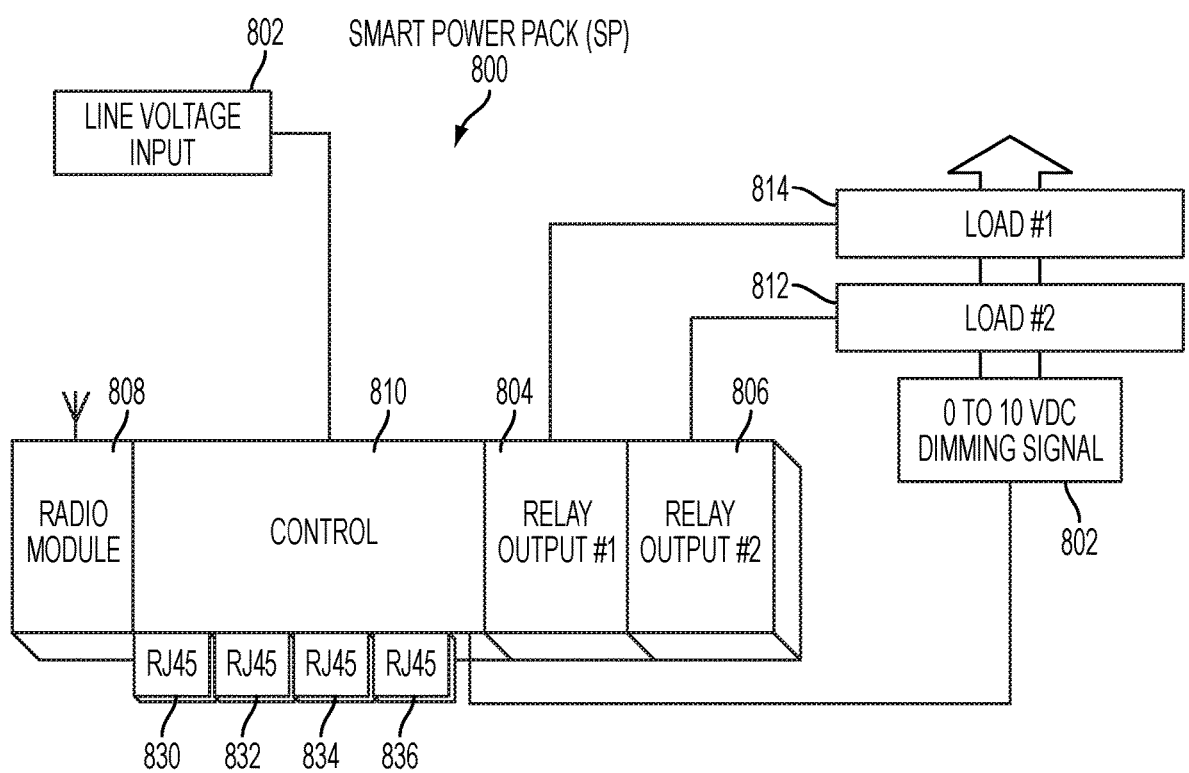
FIG. 8 is a block diagram of a system actuator constituted by a smart power pack according to an exemplary embodiment of the present invention.
Figure 9:
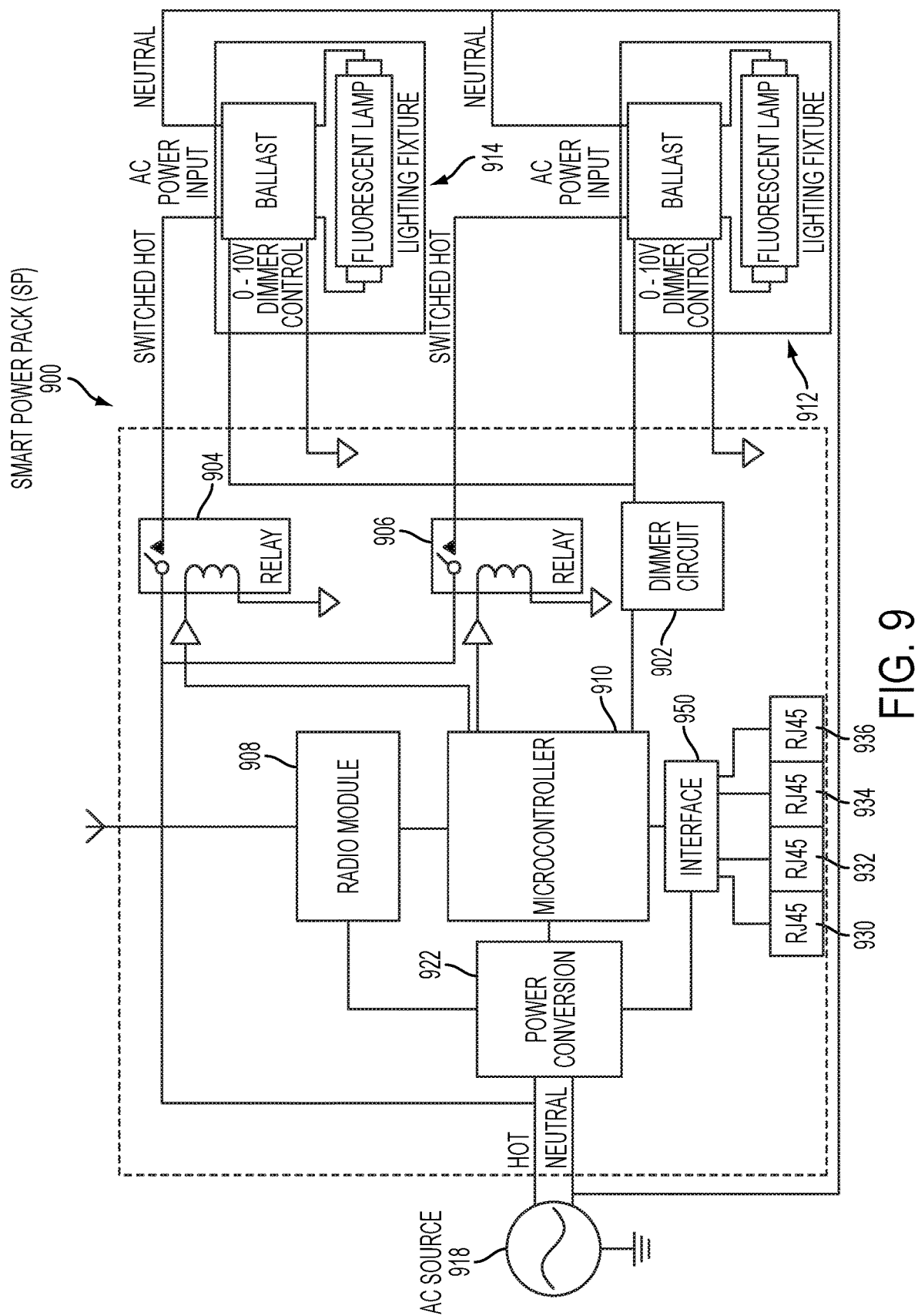
FIG. 9 is a more detailed block diagram of a system actuator constituted by a smart power pack according to an exemplary embodiment of the present invention.

Referring to FIG. 8, an exemplary implementation of SP 800 is a self-contained intelligent wireless power pack, containing either one or two independently controlled outputs via relays 804 and/or 806, and a dimming control output via dimmer circuit 802. SP 800 shares much of the electrical and firmware design with an OFM 400 and IFM 600 including, for example, control 810, an RM 808, a relay 804 that controls power to load 814, and line voltage input 802. On the other hand, SP 800 can have a different physical form factor, and like IFM 600 lacks a photocell, has dimming capabilities 802 and has options for controlling a second relay 806 in addition to first relay 804 to control power to a second load 812. FIG. 9 illustrates in more detail an exemplary implementation of SP 900, which, when attached to fixture 814 and/or 812, can provide exemplary non-limiting functionality analogous to that of IFM 500 and as descried above.

In addition, referring to FIG. 8, the SP features, for example, four ports 830, 832, 834 and 836, that can provide plug and play support for, for example, occupancy sensors (OS), daylight sensors (DS) and manual control switches (SW). When devices are plugged into any of the ports 830, 832, 834 and/or 836, the control 810 of SP 800 automatically and intelligently responds to the plugged-in devices to provide the most energy efficient operation. In an exemplary implementation, whenever a device is added or taken away, control 810 of SP 800 can automatically reconfigure the control system to the most user friendly energy wise configuration without user input.

As illustrated in the example of FIG. 9, SP 900 (as in the case of OFM 500 and IFM 700) can communicate wirelessly via RM 908 with other devices within the system's wireless self-organizing and self-healing mesh network. SP 900 includes, for example, a programmable microcontroller 910 that provides control output signals to relay 904 and/or 906, and dimmer circuit 902. SP 900 can be powered by an internal power conversion module 922, which (as in the case of an OFM 500 and IFM 700) converts high voltage from AC source 918 to a suitable DC voltage to power microcontroller 910 and RM 908.

In addition, in an exemplary implementation as illustrated in FIG. 9, SP 900 includes an interface 950 that facilitates communication between devices plugged into any of the ports 930, 932, 934 and/or 936 and microcontroller 910 to enable the plug and play support. In yet another advantageous exemplary implementation, interface 910 facilitates power output from power conversion module 922 to power devices plugged into some or all of the ports 930, 932, 934 and/or 936. In an exemplary implementation, some or all of the ports 930, 932, 934 and/or 936 are configured as an RJ45, which is known in the industry.

Figure 10:
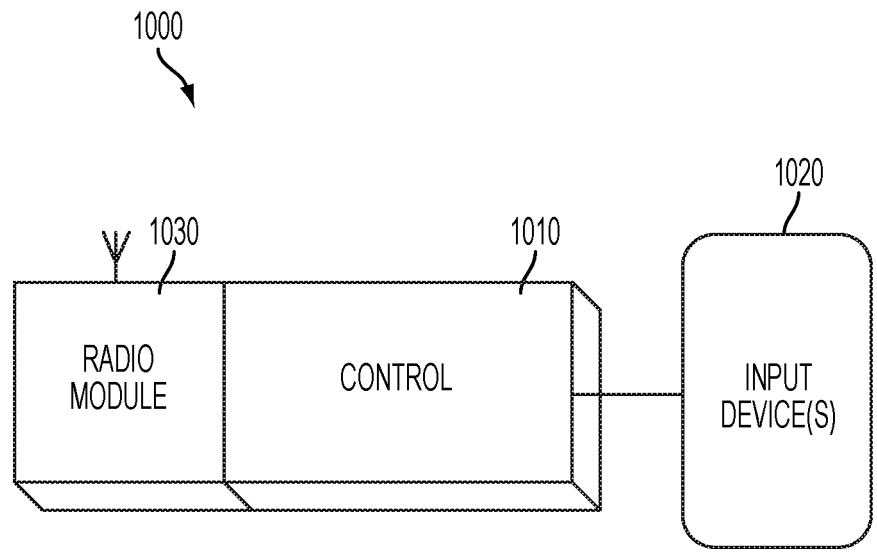
FIG. 10 is a block diagram of a wireless system sensor according to an exemplary embodiment of the present invention.
Figure 11:
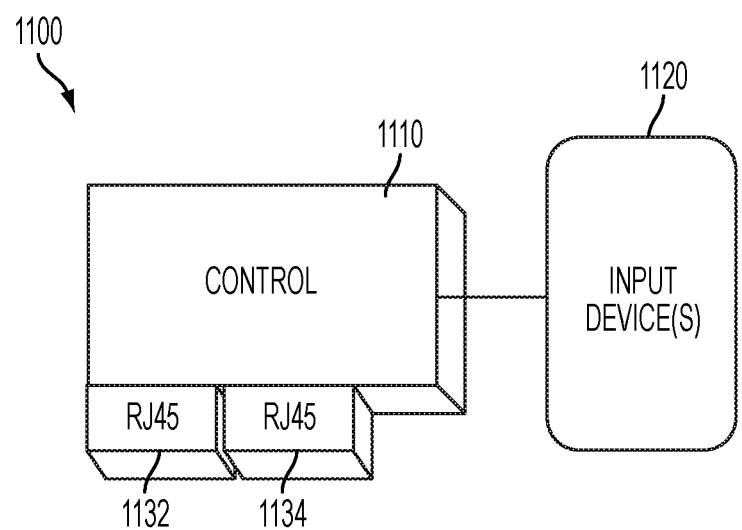
FIG. 11 is a block diagram of a wired system sensor according to an exemplary embodiment of the present invention.

The following is a more detailed description of system sensors according to exemplary embodiments of the present invention. As discussed above with reference to FIGS. 1 and 2, system sensors can include, for example, switches (SW), occupancy sensors (OS) and daylight sensors (DS). As illustrated in the block diagram of FIG. 10, system sensor 1000 can be wireless. Or, as illustrated in the block diagram of FIG. 11, system sensor 1100 can be wired. Referring to FIGS. 10 and 11, according to exemplary implementations, both wireless and wired system sensors include control 1010, 1110, respectively, comprising a microprocessor configured to receive and process information from input devices 1020, 1120, respectively, such as manual switches, photoelements of daylight sensors, or infrared/ultrasonic/microwave circuits of occupancy sensors.

In the example of FIG. 10, wireless system sensor 1000 includes RM 1030 to facilitate wireless communication with the system's other wireless devices. On the other hand, as illustrated in the example of FIG. 11, wired system sensor 1100 includes ports 1132 and/or 1134 to facilitate communication with the system's other wired devices. For example, wired system sensor 1100 can be connected to SP 900 via, for example, a standard RJ45 cable connection as a plug and play component, as described above.

Figure 12:
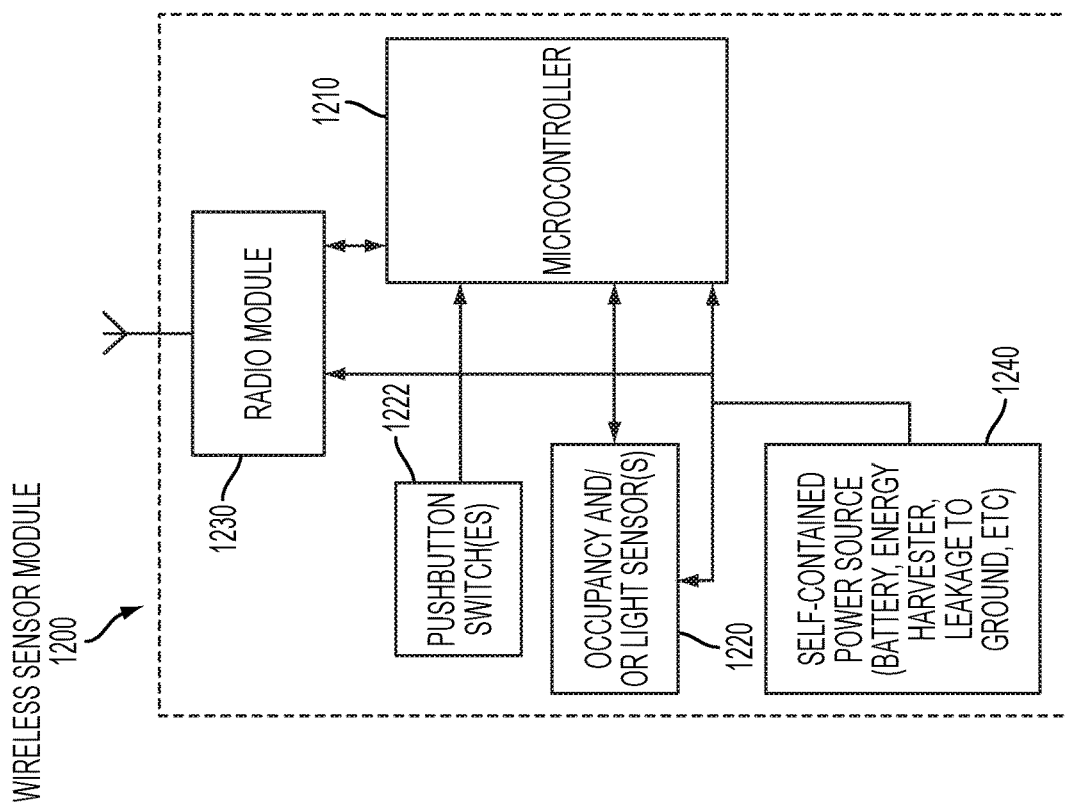
FIG. 12 is a detailed block diagram of a wireless system sensor which may be constituted as an occupancy/vacancy sensor, daylight sensor and/or as switch according to an exemplary embodiment of the present invention.

FIG. 12 illustrates an exemplary implementation of a system wireless sensor module 1200 according to an exemplary embodiment of the present invention. Operation and processing of module 1200 is controlled by a programmable microcontroller 1210 which receives and transmits information to other system devices via RM 1230. Microcontroller 1210 receives input from input devices such as, for example, one or more switches 1222 and/or one or more occupancy sensors and/or daylight sensors 1220. In an exemplary advantageous implementation, a wireless sensor module 1200 includes only one of components 1222 or 1220. As further illustrated in the example of FIG. 12, microcontroller 1210 is in two-way communication with RM 1230 and sensor(s) 1220, whereby microcontroller can receive and process input from, as well as provide commands and data to, RM 1230 and sensor(s) 1220. Components 1210, 1220 and 1230 of module 1200 can be powered by, for example, a self-contained power source 1240 such as a battery, energy harvester, leakage to ground, or other source as known in the art of power sources.

Figure 13:
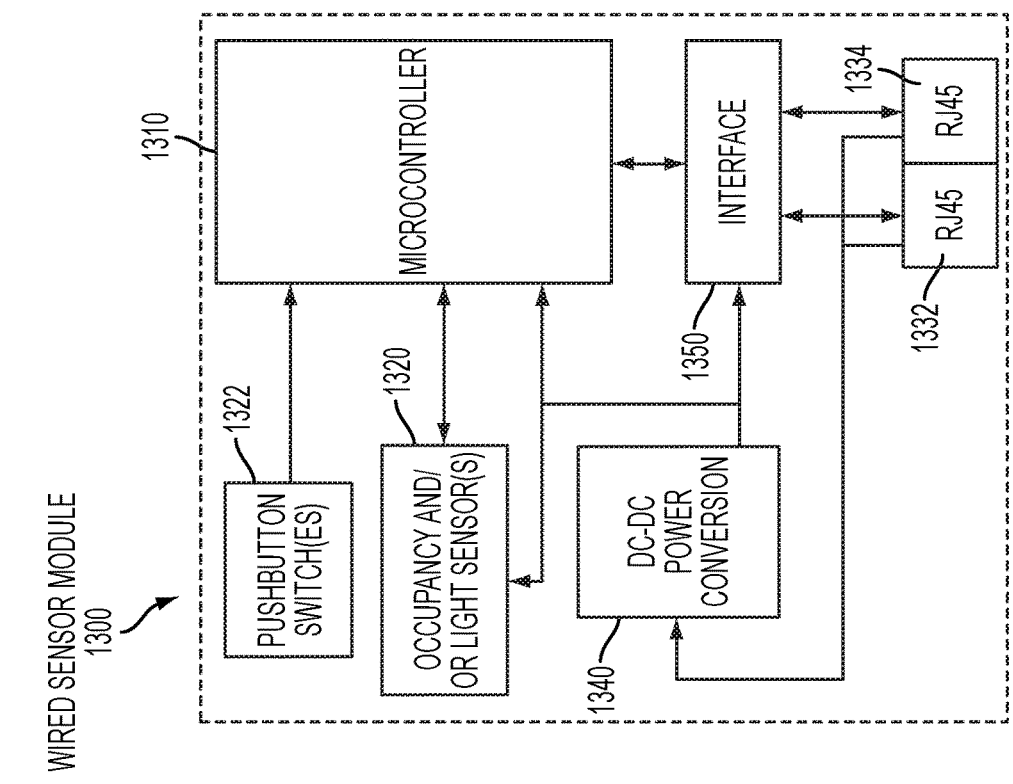
FIG. 13 is a detailed block diagram of a wired system sensor which may be constituted as an occupancy/vacancy sensor, daylight sensor and/or as switch according to an exemplary embodiment of the present invention.

FIG. 13 illustrates an exemplary implementation of a system wired sensor module 1300 according to an exemplary embodiment of the present invention. Operation and processing of module 1300 is controlled by a programmable microcontroller 1310 which receives and transmits information to other system devices via interface 1350 which connects to ports 1332 and 1334. Microcontroller 1310 receives input from input devices such as, for example, one or more switches 1322 and/or one or more occupancy sensors and/or daylight sensors 1320. In an exemplary advantageous implementation, a wireless sensor module 1300 includes only one of components 1322 or 1320. As further illustrated in the example of FIG. 13, microcontroller 1310 is in two-way communication with interface 1350 and sensor(s) 1320, whereby microcontroller 1310 can receive and process input from, as well as provide commands and data to, interface 1350 and sensor(s) 1320. Components 1310, 1320 and 1350 of module 1300 can be powered by, for example, a self-contained power conversion module 1340 which, for example, converts DC voltage received from ports 1332 and/or 1334 to DC voltage usable by components 1310, 1320 and 1350.

It should be noted that, while wired sensor module 1300 does not have a built-in wireless communication capability such as that of wireless sensor module 1200, in an exemplary advantageous implementation of a system according to an embodiment of the present invention, when module 1300 is connected to an SP 900 (see FIG. 9) via a plug and play connection, information from input device 1322 and/or 1322 can be communicated by wire (for example, via RJ45 connection) to SP 900, and then wirelessly to other system components via RM 908 of SP 900 by the same messaging protocol using, for example, area/zone/group designations.

Exemplary implementations of OS, DS, SW and RM components are described in more detail as follows.

Occupancy Sensors (OS)

OS can be, for example, a ceiling mount or a wall mount sensor that includes, for example ultrasonic (US) and passive infrared (PIR) technologies individually or in combination, to turn lighting on and off based on occupancy. OS sensors may also include adaptive sensitivity and timing technologies as described in, for example, U.S. Pat. Nos. 5,640,143 and 5,699,243, which would make such sensors' adjustments automatic.

In an exemplary implementation, OS can operate in one of two modes, "vacancy" or "occupancy," where, for example, when set to vacancy OS can, while in the occupied mode, transmit an occupied message with an indication that the sensor has been programmed for the vacancy mode of operation. When, for example, set to occupancy, OS can while in the occupied mode, transmit an occupied message with an indication that the sensor has been programmed for the occupancy mode of operation.

OS can be configured to transmit a status update (Occupied or Unoccupied) to its assigned area/zone/group(s), for example, once every minute.

In an exemplary implementation, in order for devices controlled by the occupancy sensors to be protected from being left in the occupied state in the event that an occupancy sensor goes off line while it is in the occupied state, such devices can monitor the occupied message and upon the absence of an occupied message for more than certain period of time, for example, two minutes, assume the space is no longer occupied and take appropriate action as determined by its control algorithms.

In an exemplary implementation, in order to allow devices returning from a power outage or coming on line for the first time to know if they are or are not controlled by an OS, the OS can transmit an unoccupied message, for example once every minute, while the space is unoccupied.

Daylight Sensors (DS)

In an exemplary implementation, DS measure outdoor light, ambient light or daylight levels and send the information to, for example, an SP or an IFM, which then performs switching or dimming functions taking into account the light level information provided by DS.

Switches (SW)

SW provide manual control within the system, and include an on/off switch, a General-A/V switch for switching between general lighting and audio/video (A/V) lighting, a High/Low/Off switch for High/Low lighting control, an On/Raise/Lower/Off switch, a Raise/Lower switch, a Timed On switch and a 4-button Preset switch. In an exemplary implementation, SWs are wires sensor modules (see FIGS. 11 and 13) that integrate within a system by being connected to the system's SP (see FIGS. 8 and 9) as conceptually shown in FIGS. 1, 2 and 3.

Figure 14:
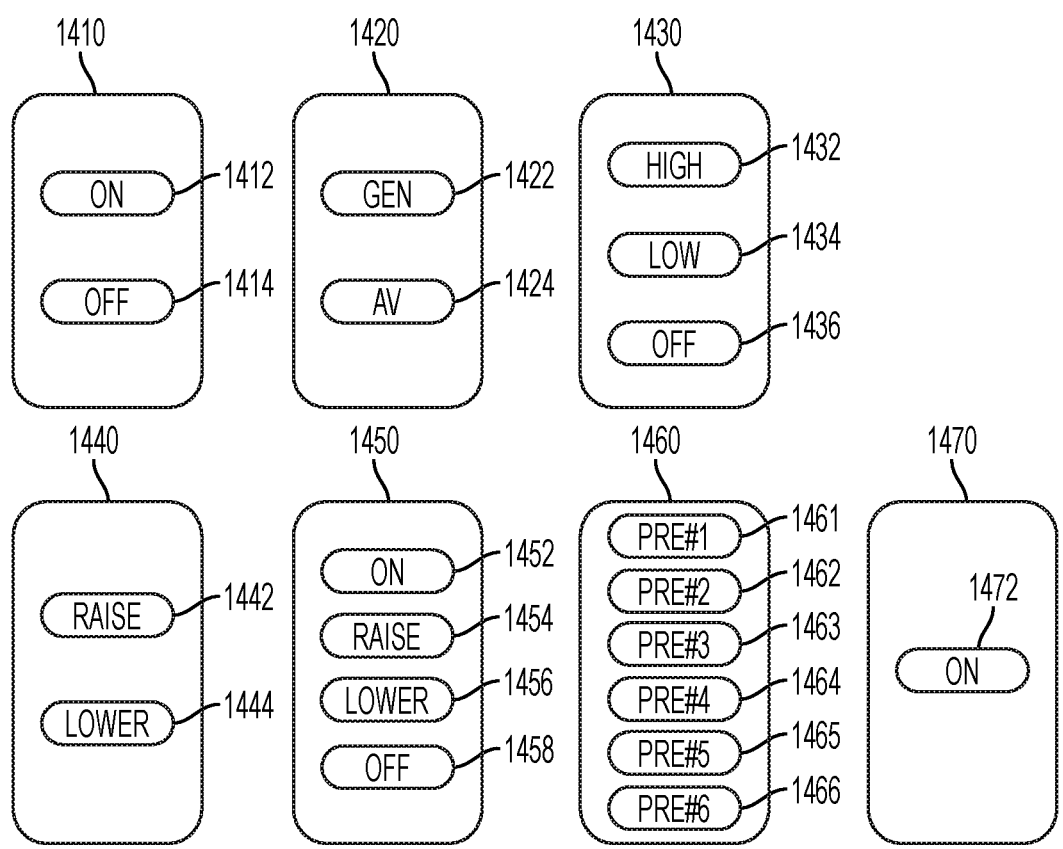
FIG. 14 provides graphical representations of system sensors constituted as switches according to exemplary embodiments of the present invention.

Referring to FIG. 14, an example of SW is a single gang switch station 1410 with two momentary push buttons On/Off. When the On button 1412 is momentarily depressed, the switch station 1410 can transmit an On command to its assigned area/zone/group(s). When the Off button 1414 is momentarily depressed, the switch station 1410 can transmit an Off command to its assigned area/zone/group(s).

Referring to FIG. 14, another example of SW is a single gang switch station 1420 with two momentary push buttons GEN/AV. When the GEN button 1422 is momentarily depressed, the switch station 1420 can transmit an A On/B Off command to its assigned area/zone/group(s). When the AV button 1424 is momentarily depressed the switch station 1420 shall transmit an B On/A Off command to its assigned area/zone/group(s).

Referring to FIG. 14, another example of SW is a single gang switch station 1430 with three momentary push buttons High/Low/Off. When the High button 1432 is momentarily depressed, the switch station 1430 can transmit an On command to its assigned Area/Zone/Group(s). When the Low button 1434 is momentarily depressed, the switch station 1430 can transmit an A On/B Off command to its assigned Area/Zone/Group(s). When the Off button 1436 is momentarily depressed, the switch station 1430 can transmit an Off command to its assigned Area/Zone/Group(s).

Referring to FIG. 14, another example of SW is a single gang switch station 1440 with two momentary push buttons Raise/Lower. When the Raise button 1442 is momentarily depressed, the switch station 1404 can transmit a Raise command to its assigned area/zone/group(s). When the Lower button 1444 is momentarily depressed, the switch station 1440 can transmit a Lower command to its assigned area/zone/group(s). If the Raise or Lower buttons are pressed continuously (i.e., held down), the switch station 1440 can, for example, repeatedly transmit the appropriate Raise or Lower command, for example every 500 milliseconds.

Referring to FIG. 14, another example of SW is a single gang switch station 1450 with four momentary push buttons On/Raise/Lower/Off. When the On button 1452 is momentarily depressed, the switch station 1450 can transmit an On command to its assigned area/zone/group(s). When the Raise button 1454 is momentarily depressed, the switch station 1450 can transmit a Raise command to its assigned area/zone/group(s). When the Lower button 1456 is momentarily depressed, the switch station 1450 can transmit a Lower command to its assigned area/zone/group(s). When the Off button 1458 is momentarily depressed, the switch station 1450 can transmit an Off command to its assigned area/zone/group(s). If the Raise or Lower buttons are pressed continuously (i.e., held down), the wireless switch station 1450 can, for example, repeatedly transmit the appropriate Raise or Lower command, for example every 500 milliseconds.

Referring to FIG. 14, another example of SW is a single gang switch station 1460 with six momentary push button Presets (1-6). When any one of preset buttons 1461-1466 is momentarily depressed, the switch station 1460 can transmit a Do Preset (1-6) command to its assigned area/zone/group(s). If a Preset button is momentarily depressed a second time within five seconds, the Do Preset (1-6) command sent to its assigned area/zone/group(s) will cause the receiving device to cancel the Fade Rate and go to the state recorded for the requested preset immediately. If the Preset button is pressed continuously for more than five seconds, the switch station 1460 can transmit the Record Preset (1-6) command to its assigned area/zone/group(s) which will cause the receiving device to record its current state as the requested preset number.

Referring to FIG. 14, another example of SW is a single gang switch station 1470 with one momentary push button Timed On. When the Timed On button 1472 is momentarily depressed, the switch station 1470 can transmit a Timed On command to its assigned area/zone/group(s). If the Timed On button 1472 is depressed momentarily, while a Timed On is active, the switch station 1470 can transmit a Timed On command to its assigned area/zone/group(s) which will cause the Timed On duration to be reset. If the Timed On button 1472 is depressed and held for five seconds, the switch station 1470 can transmit an Off command to its assigned area/zone/group(s).

Radio Module (RM)

In exemplary implementations, RM provides the wireless communication infrastructure upon which the system platform according to an embodiment of the present invention can be based. The OFM, IFM, SP and wireless system sensors all have RMs inside of them as illustrated in the examples of FIGS. 4-10 and 12.

In an exemplary non-limiting implementation, the module itself is approximately one inch square and one quarter inch thick. It can have legs like a Dual In-Line Package (DIP) integrated circuit and can be soldered to or socketed on an additional carrier board. The RM provides communication and the carrier board provides the appropriate device functionality, such as relay control or dimming. According to an embodiment of the present invention, the RM is not a stand-alone device and is attached to, for example, a carrier board.

In an exemplary implementation, RM includes a microprocessor, radio, and antenna matching network. An external antenna connector may or may not be populated, depending on the required functionality of the module. The initial frequency range of the radio can be, for example, 902 MHz to 928 MHz, but this can be changed with some antenna matching component and firmware modifications. The radio can use frequency hopping across channels, for example 75 channels, within the range to avoid collisions with other devices that may be broadcasting at interfering frequencies.

An exemplary embodiment of the present invention provides a system (as illustrated for example in FIGS. 1 and 2) of occupancy sensors, light fixtures, daylight sensors, and switches that use transceivers to communicate wirelessly with each other, or through a wireless access point (or router) AP to a network of one or more computers 124. The wireless nature of this system permits rapid, cost effective deployment of the system and retrofitting of prior lighting systems without the costs and installation burden of running network cables to each fixture in the system. Additions, replacements and reconfiguration are readily performed through the wireless communications and computer-based interface to system components facilitated by AP whose functionality is described in more detail as follows.

Wireless Access Point (AP)

According to an exemplary embodiment of the present invention, AP is a web-based device for commissioning and monitoring devices within the system's wireless mesh network. The AP provides a graphical user interface for scheduling and controlling individual devices or groups of devices enabled within the system. In an exemplary implementation, the AP instantiates an embedded web server that can be accessed via a standard web browser. An interface to the AP could be a point to point connection directly to a PC, or through the "web" as illustrated in the example of AP 120 in FIG. 1.

In an exemplary implementation, AP is a stand-alone device that is used to control and communicate with the IFM and OFM. It may include, for example, an embedded microprocessor with external SDRAM and flash memory, an 10/100 MBit Ethernet interface with Power over Ethernet (PoE) capability, and a Radio Module with external antenna. For example, a version of the Linux operating system may run on the processor. As illustrated in the example of FIG. 1, the AP 120 can provide a bridge between wired Ethernet communications, such as communication 128 associated with a local area network 136, and wireless RM communications 130 associated with wireless mesh network. The AP can be housed, for example, in a plastic box slightly larger than a conventional PC 4-port router or switch.

In an exemplary implementation, AP instantiates control and status functions via the web pages that are resident on the server. Users can communicate with the AP via any standard Internet browser, such as Internet Explorer, Firefox, Safari or Chrome. A benefit of this exemplary approach is that no additional client software needs to be installed on the user's PC. For example, many of the control and status functions can use GUI paradigms, such as drag and drop, hierarchical folders, tabs and graphical calendar scheduling, familiar to Internet browser users.

According to an exemplary embodiment of the present invention, some of the functions that can be made available when employing an AP are as follows:
1. Discovery and commissioning of new system devices.
2. Assigning and organizing area, zone and group device associations using drag and drop operations.
3. Button and slider bar controls for operations such as turning relays on and off and fixture dimming.
4. Dashboard status displays on a device-by-device basis of temperature, current, voltage, power factor, cumulative powered-on time and other information.
5. Over the air firmware updates of the devices in the system network.
6. Data and communication security via AES128 Encryption.

According to an exemplary embodiment of the present invention, it is possible to have more than one AP in a given system. It is also possible that at any given time information on AP will change and will have to be relayed to another AP. This can be achieved by, for example, an AP broadcasting a message to the other AP(s) indicating a configuration change when necessary. Each AP then updates its configuration database to maintain coherency across the system.

Figure 15:
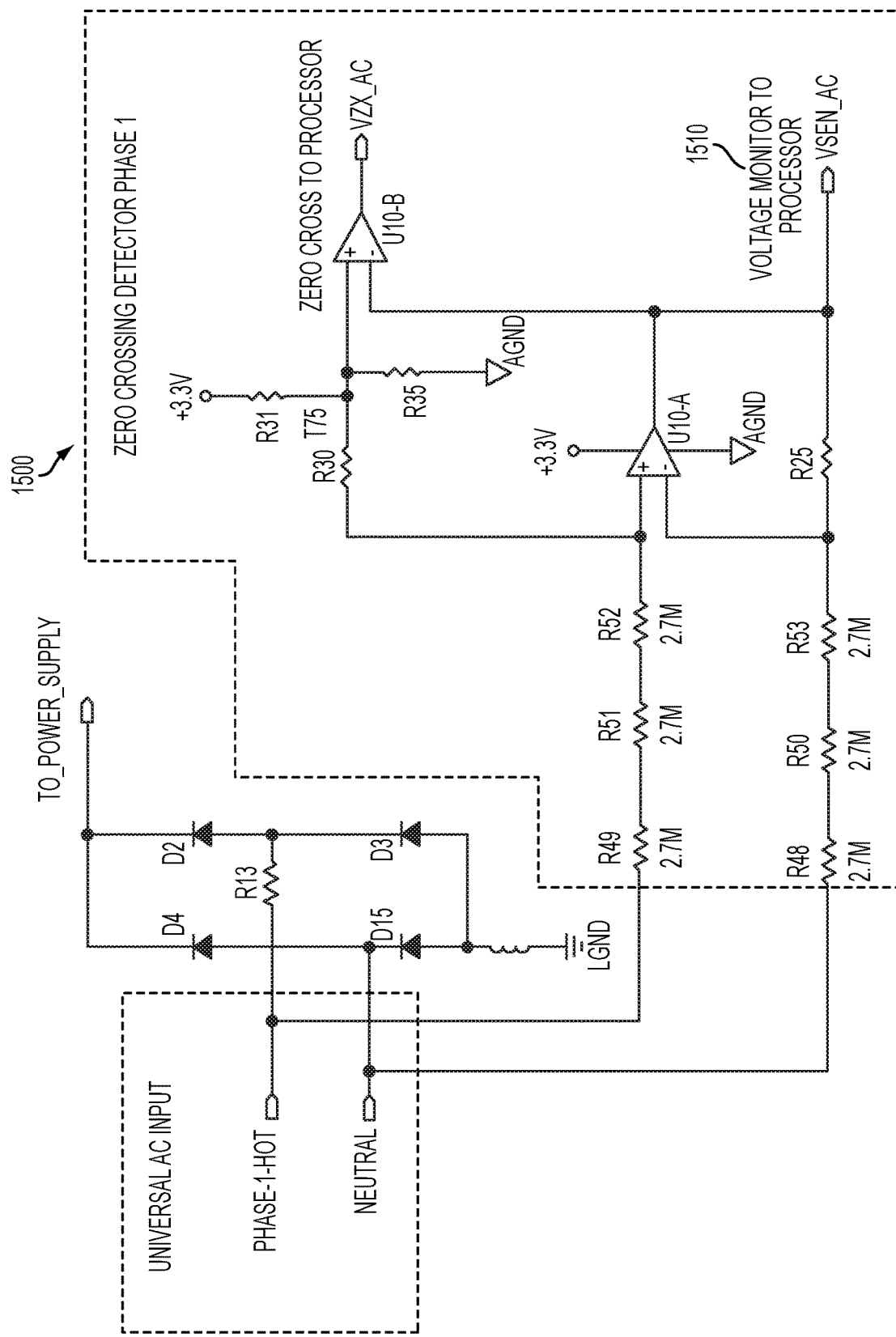
FIG. 15 is a circuit diagram illustrating a zero cross detector with AC voltage magnitude sense output to monitor voltage for power measurements according to an exemplary embodiment of the present invention.
Figure 16:
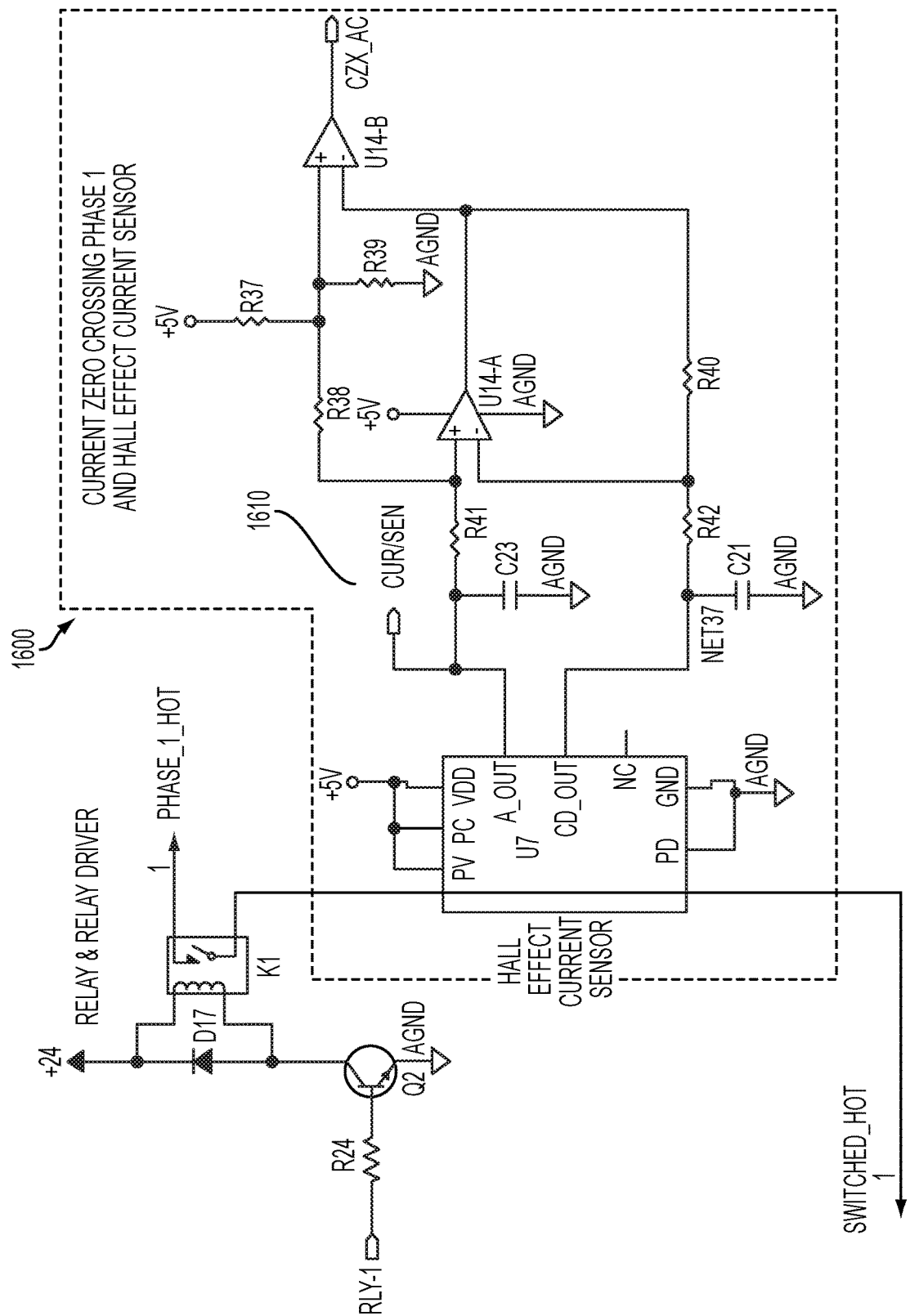
FIG. 16 is a circuit diagram illustrating a current zero cross detector that includes a current sensor according to an exemplary embodiment of the present invention

According to yet another exemplary embodiment of the present invention, actuators that include switching components (for example, SW) can use falling-edge zero-cross detection for two purposes beyond the relay activation to ensure switching on zero-crossing of an AC waveform. For example, by synchronizing the voltage zero-cross and current zero-cross to the same timer, the differences in their occurrence equates to lead/lag time, which can be used by user software to measure power factor. Also, the measured period can be used to calculate a quarter cycle and take peak magnitude readings at a later interrupt. An example of a zero cross detector circuit 1500 with AC voltage magnitude sense output 1510 to monitor voltage for power measurements is illustrated in FIG. 15. An example of a current zero cross detector circuit 1600 that includes a current sensor 1610 is illustrated in FIG. 16.

According to yet another exemplary embodiment of the present invention the wireless communication between the wireless devices and/or nodes (OFM, IFM and SP) of the system is described with reference to an exemplary implementation of a system communication protocol that provides five classes or types of messages that are transmitted amongst nodes in the mesh network of the wireless lighting control system including: Broadcast, Area, Zone, Group, and Unicast messages. The messages transmitted among the nodes include information for addressing the messages to the nodes, message type and payload, as well as other messaging features.

According to an exemplary implementation, the underlying mesh network protocol can utilize SNAP to create a peer-to-peer, self-organizing and self-healing mesh network infrastructure. In such an exemplary implementation, as illustrated in a conceptual diagram of FIG. 17, all wireless devices are nodes within the system's mesh network configured as peers to each other that can also act as repeaters that forward messages to other wireless devices that are out of range of the device(s) originating the message (providing a virtually unlimited network size). The system's mesh network can be self organizing (it builds automatically), without requiring a coordinator, thus avoiding a single point failure. The system's network can also be self healing such that wireless devices will automatically reroute messages around a failed device to ensure message delivery.

According to an exemplary implementation of the present invention, a communication protocol is implemented for transmitting messages amongst nodes in the system's wireless control network with the following features: multi-hop (multi-radius) mesh, auto-forming network; no required coordinator; unique network identifiers for each node via MAC addresses; and no single point of failure. In particular, according to an exemplary embodiment, by utilizing SNAP in the underlying mesh network, a coordinator is not required for transmitting messages amongst nodes in the system's mesh network. That is, messages can be transmitted from one node to other node(s), utilizing unique network identifiers for each node defined by area/zone/group association as described above.

An AP can be used in an exemplary system to provide access to the system's network from a local network or the Internet, as illustrated for example in FIG. 1, via a standard browser. According to an exemplary embodiment, the AP is a web-based device for commissioning and monitoring devices (and/or groups of devices) within the system's wireless mesh network. As illustrated in the example of FIG. 1, AP communicates with a local area network, or the Internet, over wired TCP/IP connections using HTTPS/SSL, and wirelessly when transmitting to other devices within the system's wireless self-healing mesh network, for example, over the 900 MHz radio frequency using 128-bit AES. That is, according to an exemplary embodiment, the AP communicates, for example, (1) over wired TCP/IP connections with the local network or the Internet, and (2) wirelessly, for example over 900 MHz radio frequency, with other wireless components ("nodes") within the system's wireless mesh network. Thus, AP can provide a bridge between wired Ethernet communications, and wireless RM communications.

As explained above, an exemplary implementation of a system according to the present invention may include one or more of the following components:
 (1) Ceiling Mount and Wall Mount Occupancy/Vacancy Sensor ("OS");
 (2) Daylight Sensor ("DS");
 (3) On-Fixture Module ("OFM");
 (4) In-Fixture Module ("IFM");
 (5) Switch ("SW");
 (6) Smart Pack ("SP"); and
 (7) Wireless Access Point ("AP").

The OFMs, IFMs and SPs are wireless components that enable wireless communication between OS, DS and SW. That is, in a system according to an exemplary embodiment of the present invention, the wireless components are "nodes" within a wireless mesh network configured as peers to each other that can also act as repeaters that forward messages to other wireless components that are out of range of the device(s) originating the message. Such a capability provides a network of virtually unlimited geographic size, which makes systems according to exemplary embodiments of the present invention well-suited for large or multi-level office buildings.

According to an exemplary embodiment of the present invention, wireless communication between system's wireless components including OFMs, IFMs, SPs and AP is governed by a message protocol whose salient features are discussed below in detail for illustrative purposes and to facilitate a more complete understanding of certain exemplary embodiments of the present invention.

According to an exemplary embodiment of the present invention, general packet format for wireless communication among the system's wireless components is shown in Table 1 below.

TABLE 1

General Packet Format

| BYTE | 7 | 6 | 5 | 4 | 3 | 2 | 1 | 0 |
|---|---|---|---|---|---|---|---|---|
| 0 | HEADER BYTE | | | | | | | |
| 1 | DESTINATION MAC ADDRESS BYTE 4 | | | | | | | |
| 2 | DESTINATION MAC ADDRESS BYTE 3 | | | | | | | |
| 3 | DESTINATION MAC ADDRESS BYTE 2 | | | | | | | |
| 4 | DESTINATION MAC ADDRESS BYTE 1 | | | | | | | |
| 5 | AREA CONFIGURATION PARAMETER BYTE | | | | | | | |
| 6 | ZONE CONFIGURATION PARAMETER BYTE | | | | | | | |
| 7 | GROUP CONFIGURATION PARAMETER BYTE 2 | | | | | | | |
| 8 | GROUP CONFIGURATION PARAMETER BYTE 1 | | | | | | | |
| 9 | MESSAGE TYPE BYTE 2 | | | | | | | |
| 10 | MESSAGE TYPE BYTE 1 | | | | | | | |
| 11 | DATA LENGTH (N) | | | | | | | |
| 12 | DATA PAD LENGTH (P) | | | | | | | |
| (13) | DATA BYTE 1 | | | | | | | |
| (14) | DATA BYTE 2 | | | | | | | |
| ... | ... | | | | | | | |
| (12 + N) | DATA BYTE N | | | | | | | |
| (13 + N) | PAD BYTE 1 (0x00) | | | | | | | |
| ... | ... | | | | | | | |
| (12 + N + P) | PAD BYTE P (0x00) | | | | | | | |
| 13 + N + P | CRC BYTE 2 | | | | | | | |
| 14 + N + P | CRC BYTE 1 | | | | | | | |

Header Byte: 0x01-ASCI Start of Header Character (SOH)
Destination MAC Address: This is an 8 nibble word to hold the least significant portion of the MAC address. Use 0xFFFFFFFF for any message that will be addressed to multiple units.
Area Configuration Parameter: This byte can be used to address a message to any one of 64 possible customer areas. Use 0xFF to send to all customer areas.
Zone Configuration Parameter: This byte can be used to address a message to any one of 64 possible customer zones. Use 0xFF to send to all customer zones.
Group Configuration Parameter Bytes: This 16-bit field allows a message to be addressed to multiple customer groups in a given Area & Zone. Use 0xFFFF to send to all groups.
Message Type: This 16-bit field indicates the message function. It is populated by an enumerated list.
Data Length: Indicates number of bytes making up broadcast message can be 0 to 33.
Data Pad Legth: The data encryption algorithm requires the total packet length to be a multiple of 16. This byte can be 0-15, representing the number of padding characters added. On an empty data field message, there will be 1 padding byte.
Data Byte 1-N: Message data, 0 to 33 bytes.
Pad Byte 1-P: 0x00, Message padding, 0 to 15 bytes.
CRC: 16-bit CRC of byte 0 through byte 17 + N + P. The Polynomial used is 0x1021.

The exemplary message structure includes a Destination Address in bytes 1-4 (the "To" address) but intentionally omits the source ("From") address field. Messages according to the exemplary protocol may be Unicast, Multicast or Broadcast.

For example, Unicast messages are used to communicate from the AP to a single node (constituted by, for example, an OFM, IFM or SP). In this case, the destination MAC Address of the node is filled out, but the Area, Zone and Group Configuration Parameter Bytes are not used. If information is to be returned in the response from the single node, the address of the AP is loaded in the data field (bytes 13-16).

An example of a Unicast message is shown in Table 2 below (in the example, this message is used to retrieve the current Voltage Magnitude reading at a Node).

TABLE 2

Get Voltage Magnitude Message Format

| BYTE | 7 | 6 | 5 | 4 | 3 | 2 | 1 | 0 |
|---|---|---|---|---|---|---|---|---|
| 0 | 0x01 | | | | | | | |
| 1-8 | UNICAST ADDRESSING | | | | | | | |
| 9 | 0x10 | | | | | | | |
| 10 | 0x51 | | | | | | | |
| 11 | 0x04 | | | | | | | |
| 12 | 0x0D | | | | | | | |
| 13-16 | ACCESS POINT MAC ADDRESS | | | | | | | |
| 17-29 | 0x00 | | | | | | | |
| 30 | CRC BYTE 2 | | | | | | | |
| 31 | CRC BYTE 1 | | | | | | | |

Addressing: Unicast Addressing
Message Type: 0x1051
Data Length: 0x04
Data Pad Length: 0x0D
Access Point MAC Address: Addressing for response
Pad Bytes: 0x00

The response to this message is shown in Table 3 below. The destination address field is populated with the address of the AP that requested the information. The return data is in the data field. However, there is no source "From" address anywhere in the response packet. That is, according to an exemplary implementation, the AP keeps track of requests and matches responses to requests within its internal database.

TABLE 3

Voltage Magnitude Response Format

| BYTE | 7 | 6 | 5 | 4 | 3 | 2 | 1 | 0 |
|---|---|---|---|---|---|---|---|---|
| 0 | 0x01 | | | | | | | |
| 1-8 | ACCESS POINT MAC ADDRESS | | | | | | | |
| 9 | 0x20 | | | | | | | |
| 10 | 0x51 | | | | | | | |
| 11 | 0x02 | | | | | | | |
| 12 | 0x0F | | | | | | | |
| 13 | VOLTAGE 2 | | | | | | | |
| 14 | VOLTAGE 1 | | | | | | | |
| 15-29 | 0x00 | | | | | | | |
| 30 | CRC BYTE 2 | | | | | | | |
| 31 | CRC BYTE 1 | | | | | | | |

Addressing: The MAC Address of the requesting Access Point
Message Type: 0x2051
Data Length: 0x02
Data Pad Length: 0x0F
Pad Byte 1-15: 0x00
Voltage: The magnitude reading of the AC voltage at the node as a 16 bit unsigned number (Vx100).

The Node Find Message is an example of a message that can either be Multicast or Broadcast. In both cases, bytes 1-4 are set to 0xFFFF. The data field, contained in bytes 13-16 is set to the source MAC address of the Access Point. If the message is a Broadcast message, bytes 5-8 are also set to 0xFFFF. This indicates that the message should be acted upon by all devices. If the message is a Multicast message, the Area, Zone and Group fields are populated. Devices that are set to the corresponding Area, Zone and Group respond to this type of message.

In an exemplary implementation, the Node Finding message, as illustrated in Table 4 below, can be used by participants during network discovery to identify what nodes are within range. Because the targets are not known at start, it should be sent as a broadcast or area/zone/group-cast format only.

TABLE 4

Node Find Message Format

| BYTE | 7 | 6 | 5 | 4 | 3 | 2 | 1 | 0 |
|---|---|---|---|---|---|---|---|---|
| 0 | | | | 0x01 | | | | |
| 1-8 | | | BROADCAST OR AREA/ZONE/GROUP-CAST ADDRESSING | | | | | |
| 9 | | | | 0x10 | | | | |
| 10 | | | | 0x02 | | | | |
| 11 | | | | 0x04 | | | | |
| 12 | | | | 0x0D | | | | |
| 13-16 | | | SOURCE MAC ADDRESS | | | | | |
| 17-29 | | | | 0x00 | | | | |
| 30 | | | | CRC BYTE 2 | | | | |
| 31 | | | | CRC BYTE 1 | | | | |

Addressing: Broadcast or Area/Zone/Group-cast only
Message Type: 0x1002
Data Length: 0x04
Data Pad Length: 0x0D
Source MAC Address: The MAC address of the Access Point doing the discovery
Pad Byte: 0x00

The response to the Node Find Message is the Who Am I Response, as illustrated in the example of Table 5 below. Independent of whether the original Node Find Message was addressed to all nodes (Broadcast) or a subset of the nodes (Multicast), the response is always Unicast. Each node sends a response back to the AP that sent out the message. The destination address field is populated with the address of the AP. The return data includes the Node's "From" address and area/zone/group configuration parameters, but does not include any sensor data.

In an exemplary implementation, a generic response to a Node Find Message contains information about the sender for forming a network topology.

TABLE 5

Who Am I Response Format

| BYTE | 7 | 6 | 5 | 4 | 3 | 2 | 1 | 0 |
|---|---|---|---|---|---|---|---|---|
| 0 | | | | 0x01 | | | | |
| 1-8 | | | ACCESS POINT MAC ADDRESS | | | | | |
| 9 | | | | 0x20 | | | | |
| 10 | | | | 0x02 | | | | |
| 11 | | | | 0x0B | | | | |
| 12 | | | | 0x06 | | | | |
| 13 | | | | MY FACILITY BYTE 2 | | | | |
| 14 | | | | MY FACILITY BYTE 1 | | | | |
| 15 | | | | MY MAC ADDRESS BYTE 4 | | | | |
| 16 | | | | MY MAC ADDRESS BYTE 3 | | | | |
| 17 | | | | MY MAC ADDRESS BYTE 2 | | | | |
| 18 | | | | MY MAC ADDRESS BYTE 1 | | | | |
| 19 | | | MY AREA CONFIGURATION PARAMETER BYTE | | | | | |
| 20 | | | MY ZONE CONFIGURATION PARAMETER BYTE | | | | | |
| 21 | | | MY GROUP CONFIGURATION PARAMETER BYTE 2 | | | | | |
| 22 | | | MY GROUP CONFIGURATION PARAMETER BYTE 1 | | | | | |
| 23 | | | | DEVICE TYPE BYTE | | | | |
| 24-29 | | | | 0x00 | | | | |
| 30 | | | | CRC BYTE 2 | | | | |
| 31 | | | | CRC BYTE 1 | | | | |

Addressing: The addressing for this message is the MAC Address that was in the Node Find Message.
Message Type: 0x2002
Data Length: 0x0B
Data Pad Length: 0x06
My Facility: The Network ID from the Radio paired with the node
My MAC Address: The MAC Address from the Radio paired with the nod.
My Area Config: What the STM32 has in FLASH for local Area Configuration Parameter
My Zone Config: What the STM32 has in FLASH for local Zone Configuration Parameter
My Group Config: What the STM32 has in FLASH for local Group Configuration Parameter
Device Type: Enumerated code for the type of device that is responding As noted above, according to an exemplary embodiment of the present invention, system components can be arranged as illustrated in FIGS. 1 and 2.

In an exemplary implementation of a message protocol according to the present invention, messages transmitted among the OFM, IFM, SP and AP do not have a "From" address field, only the "To" address field. Messages transmitted from AP to OFM, IFM, and SP include "Node Find" and "Get Information" messages. Messages transmitted from the OFM, IFP and SP to the AP include "Who Am I Response" and "Information Response" messages.

For example, the "Node Find" message from the AP to the node(s) can be Broadcast for reply by all node(s), or Multicast for reply by certain node(s), and includes AP's "From" address in the message, but no sensor data. In reply to the "Node Find" message, each of the addressed node(s) sends a "Who Am I Response" message that includes the node's From address and configuration parameters, but does not have any sensor data.

On the other hand, according to yet another exemplary implementation, the "Get Information" messages from the AP are always Unicast for reply by a specific node (e.g., an AP with a connected OS) and include the AP's "From" address in the message, but no data from OS. In reply to the "Get Information" message, the specific node sends an "Information Response" message that has the OS data (for the OS associated with the node), but does not have the node's "From" address because the AP knows which node it asked to send the information.

The following table summarizes the differences in these exemplary implementations:

| AP Message | Node Responding | Node Response |
|---|---|---|
| "All addressed Nodes, who is on the network?" (aka: Node Find) | All addressed Nodes | "Access Point, node identifying information." (aka: Who Am I Response) |
| "Node X, give me your sensor data" (aka: Get Information) | Node X | "Access Point, sensor data." (aka: Information Response) |

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

We claim:

1. A lighting system comprising:
a plurality of luminaires for illuminating a space;
a plurality of actuators respectively associated with said luminaires to selectively control illumination output by said respective luminaires, each actuator having an identifier; and
a plurality of input modules, each configured to process information associated with at least a portion of said space and to communicate results of said processing to at least one of said plurality of actuators,
wherein at least one selectively designated input module of said plurality of input modules is associated with a first identifier indicative of a logical control perimeter within said space;
at least one selectively designated actuator of said plurality of actuators is associated with said first identifier;

at least one actuator of said plurality of actuators forms a node in a wireless self-healing self-forming mesh network; said selectively designated input module wirelessly communicates said results of said processing to said selectively designated actuator using a communication protocol including said first identifier; and said selectively designated actuator controls illumination output of at least one of said luminaires associated therewith based on said wirelessly communicated results of said processing, wherein said selectively designated actuator is configured to communicate with said plurality of actuators and said input modules via an access point, wherein wireless communication between said access point, said plurality of actuators, and said input modules includes first messages received from said access point by said plurality of actuators and said input modules Broadcast for reply by said plurality of actuators and said input modules, or Multicast for reply by certain of said plurality of actuators and said input modules, said first messages comprising a destination address field and a network address of said access point loaded in a data field of said first messages, said first messages lacking a source address field, second messages in reply to said first message by each of said plurality of actuators and input modules, said second messages comprising at least one of a from address and configuration parameters of said addressed actuators and said input modules, third messages from the access point to a specific one of said plurality of actuators and said input modules Unicast for reply by said specific one of said plurality of actuators and said input modules, said third messages comprising a destination address field and a network address of said access point loaded in a data field of said third messages, said third messages lacking a source address field, and fourth messages in reply to said third messages, whereby said specific one of said plurality of actuators and said input modules send said fourth messages comprising data from said one of said input modules, said fourth messages lacking a source address field.

2. The system of claim 1, wherein each actuator of said plurality of actuators comprises
a microprocessor;
a radio module connected to said microprocessor to communicate received wireless communication to said microprocessor and transmit wireless communication from said microprocessor; and
at least one relay connected to said microprocessor for selectively controlling power to at least one of said luminaires associated with said actuator.

3. The system of claim 1, wherein
said plurality of actuators comprises at least one of an in-fixture module (IFM), an on-fixture module (OFM), and a smart pack (SP); and
said plurality of input modules comprises at least one of an occupancy or vacancy sensor (OS), daylight sensor (DS), and a switch (SW),
each of the IFM, OFM and SP comprising a radio module (RM), said IFM, OFM and SP communicating wirelessly via the RM.

4. The system of claim 2, wherein
said node further comprises at least one input module of said input modules in wired communication with said at least one actuator; and
said results of said processing by said at least one input module are communicated wirelessly to at least one other actuator forming another node in said mesh network via said radio module of said at least one actuator.

5. The system of claim 2, wherein
at least one of said actuators further comprises a dimming circuit for controlling variable light output by at least one of said luminaires associated therewith.

6. The system of claim 1, wherein
the at least one of said input modules comprises a sensor for monitoring changes in at least one of occupancy, vacancy and daylight within at least a portion of said space.

7. The system of claim 1, wherein
said plurality of actuators form a corresponding plurality of nodes in a wireless self-healing self-forming mesh network.

8. The system of claim 1, wherein
said space comprises a plurality of logical control perimeters,
said system comprises a plurality of identifiers respectively indicative of said plurality of logical control perimeters, wherein each logical control perimeter includes at least one actuator and at least one input module, and
each of said plurality of actuators and each of said plurality of input modules is associated with at least one of said respective plurality of identifiers.

9. The system of claim 8, wherein
said space comprises a plurality of areas,
each of said areas comprises a plurality of zones,
each of said zones comprises a plurality of groups,
each of said logical control perimeters is associated with one of said areas, one of said zones, and at least two of said groups, and
each of said plurality of first identifiers comprises information indicative of said one of said areas, said one of said zones, and said at least two of said groups.

10. The system of claim 9, wherein
at least one of said areas, zones or groups is indicative of a location within said space.

11. The system of claim 1, further comprising
a wireless server module for at least one of commissioning, monitoring and controlling said actuators and said input modules, said service module communicating wirelessly with said actuators and said input modules and connecting via a TCP/IP to a server in a local area network.

12. The system of claim 11, further comprising
a controlling user interface (UI) deployed for said commissioning, monitoring and controlling said actuators and said input modules via said wireless service module,
said UI including web pages that reside on a web server accessible by a web browser.

13. The system of claim 12, wherein
said controlling user interface and said wireless service module are configured to selectively designate at least one said actuators and at least one of said input modules with said identifier.

14. A system comprising:
a plurality of lighting devices;
a plurality of wireless modules;

a plurality of environmental sensors;
a wireless access point;
and a controller;
wherein at least one of said wireless modules controls light output of at least one of said lighting devices based on an output of at least one of said environmental sensors associated with said at least one of said wireless modules by a selectively defined identifier indicative of a logical control perimeter within a space;
said output of said at least one environmental sensor comprising information indicative of said selectively defined identifier;
said controller communicates via said access point with said at least one of said wireless modules and said at least one of said environmental sensors to associate said selectively defined identifier with said at least one of said wireless modules and said at least one of said environmental sensors;
said plurality of wireless modules form a wireless mesh network, wherein said controller is configured to communicate with said wireless modules and said at least one of said environmental sensors using first messages, second messages, third messages, and fourth messages;
said first messages from said access point to the wireless modules Broadcast for reply by said wireless modules, or Multicast for reply by certain of said wireless modules, said first messages comprising a destination address field and a network address of said access point loaded in a data field of said first messages, said first messages lacking a source address field;
said second messages in reply to said first message by each of said addressed wireless modules, said second messages comprising at least one of a from address and configuration parameters of said addressed wireless modules;
said third messages from the access point to a specific one of said plurality of wireless modules Unicast for reply by said specific one of said plurality of wireless modules, said third messages comprising a destination address field and a network address of said access point loaded in a data field of said third messages, said third messages lacking a source address field; and
fourth messages in reply to said third messages, whereby said specific one of said plurality of wireless modules sends said fourth messages comprising data from said at least one environmental sensor associated with said specific one of said plurality of wireless modules, said fourth messages lacking a source address field.

15. The system of claim 14, wherein
said wireless modules include at least one of an in-fixture module (IFM), and an on-fixture module (OFM);
said wireless access point comprises a web-based interface for commissioning and monitoring at least one of said plurality of wireless modules;
said wireless access point communicates with at least one of a local area network and the Internet, over a wired connection;
said wireless access point communicates wirelessly with at least one of the wireless modules using radio frequency communication; and
said controller comprises at least one computer in communication with at least one of said local area network and the Internet.

16. The system of claim 14, wherein said first, second and third messages do not include data from said environmental sensors.

17. The system of claim 14, wherein said fourth messages do not include a from address of said specific one of said plurality of wireless modules.

18. The system of claim 14, wherein at least one of said plurality of lighting devices comprises a light fixture.

19. The system of claim 14, wherein at least one of said plurality of environmental sensors comprises an occupancy sensor, a temperature sensor, a power consumption sensor, or a daylight sensor.

20. An actuator comprising:
a microprocessor;
a radio module connected to said microprocessor to communicate received wireless communication to said microprocessor and transmit wireless communication from said microprocessor wherein the communication includes an identifier indicative of a logical control perimeter within a space;
at least one relay connected to said microprocessor for selectively controlling power to at least one load associated with said actuator;
at least one port configured to receive input from an input device plugged into said at least one port;
at least one interface providing communication between said input device plugged into said at least one port and said microprocessor to enable the plug and play support for said input device;
a power module supplying voltage to power to said microprocessor, said radio module, and said interface;
wherein said plug and play support includes said microprocessor automatically recognizing said input device;
adapting input and output processing to receive input information from said input device;
based on said input information selectively modifying said wireless communication from said microprocessor or selectively modifying said power to said at least one load;
the actuator forms a node in a wireless self-healing self-forming mesh network; the actuator configuring said microprocessor to communicate with said actuator and input modules via said interface;
wherein communication between said interface, said actuator, and said input modules includes
first messages from the interface to the said actuators and said input modules Broadcast for reply by said actuators and said input modules, or Multicast for reply by certain of said actuators and said input modules, said first messages comprising a destination address field and a network address of said interface loaded in a data field of said first messages, said first messages lacking a source address field;
second messages in reply to said first message by each of said addressed actuators and input modules, said second messages comprising at least one of a from address and configuration parameters of said addressed actuators and said input modules;
third messages from the interface to a specific one of said actuators and said input modules Unicast for reply by said specific one of said actuators and said input modules, said third messages comprising a destination address field and a network address of said interface loaded in a data field of said third messages, said third messages lacking a source address field; and
fourth messages in reply to said third messages, whereby said specific one of said actuators and said input modules sends said fourth messages comprising data from said one of said input modules, said fourth messages lacking a source address field.

21. The actuator of claim 20, wherein
said input device comprises one of an occupancy sensor, a vacancy sensor, a daylight sensor, or a switch.

22. The actuator of claim 20, further comprising
a plurality of ports,
wherein said interface comprises a bus providing said communication between one or more input devices plugged into said plurality of ports and said microprocessor,
said microprocessor automatically recognizing said input devices,
adapting input and output processing to receive input information from each of said input devices, and
based on said input information selectively modifying said wireless communication from said microprocessor or selectively modifying said power to said at least one load.

23. The actuator of claim 20, wherein
said power module supplies voltage to said port to power said input device.

24. A method for controlling lighting, the method comprising configuring a plurality of luminaires for illuminating a space;
associating a plurality of actuators with said luminaires, each of said actuators selectively controlling illumination output by at least one of said luminaires;
configuring said plurality of actuators to form a corresponding plurality of nodes in a wireless self-healing self-forming mesh network;
configuring a plurality of input modules to process information associated with at least a portion of said space and to communicate results of said processing to at least one of said plurality of actuators;
associating at least one selectively designated input module of said plurality of input modules with a first identifier indicative of a logical control perimeter within said space;
associating at least one selectively designated actuator of said plurality of actuators with said first identifier;
wirelessly communicating said results of said processing by said selectively designated input module to said selectively designated actuator using said first identifier;
controlling illumination output of at least one of said luminaires associated with said selectively designated actuator based on said wirelessly communicated results of said processing; and
configuring a controller to communicate with said actuators and said input modules via an access point, wherein wireless communication between said access point, said plurality of actuators, and said input modules includes
first messages received from said access point by said plurality of actuators and said input modules Broadcast for reply by said plurality of actuators and said input modules, or Multicast for reply by certain of said plurality of actuators and said input modules, said first messages comprising a destination address field and a network address of said access point loaded in a data field of said first messages, said first messages lacking a source address field,
second messages in reply to said first message by each of said plurality of actuators and input modules, said second messages comprising at least one of a from address and configuration parameters of said addressed actuators and said input modules,
third messages from the access point to a specific one of said plurality of actuators and said input modules Unicast for reply by said specific one of said plurality of actuators and said input modules, said third messages comprising a destination address field and a network address of said access point loaded in a data field of said third messages, said third messages lacking a source address field, and
fourth messages in reply to said third messages, whereby said specific one of said plurality of actuators and said input modules send said fourth messages comprising data from said one of said input modules, said fourth messages lacking a source address field.

25. The method of claim 24, wherein
at least one of said input modules comprises a sensor for monitoring changes in at least one of occupancy, vacancy and daylight within at least a portion said space.

26. The method of claim 24, further comprising
defining a plurality of logical control perimeters within said space;
defining a plurality of identifiers respectively indicative of said plurality of logical control perimeters; and
associating each of said plurality of actuators and each of said plurality of input modules with at least one of said respective plurality of identifiers.

27. The method of claim 26, further comprising
defining a plurality of areas associated with said space;
defining a plurality of zones associated with each of said areas,
defining a plurality of groups associated with each of said zones,
associating each of said logical control perimeters with one of said areas, one of said zones, and at least two of said groups, and
defining each of said plurality of identifiers to include information indicative of said one of said areas, said one of said zones, and said at least two of said groups.

28. A system comprising:
a plurality of luminaires for illuminating a space;
a plurality of actuators respectively associated with said luminaires to selectively control illumination output by said respective luminaires;
a plurality of input modules, each configured to process information associated with at least a portion of said space and to communicate results of said processing to at least one of said plurality of actuators;
a wireless access point;
and a controller;
wherein each of said plurality of input modules and said plurality of actuators is associated with at least one of a plurality of identifiers each indicative of a logical control perimeter within said space, each of said actuators controls said illumination output by at least one of said respective luminaires based on said results of said processing by those of said input modules associated with the same one of said plurality of identifiers as said each of said actuators;
said controller communicates via said access point with said at least one of said actuators and said input modules to associate at least one of said identifiers with each of said actuators and said input modules;

and said plurality of wireless modules form a wireless mesh network, and communication among said plurality of said wireless modules;

wherein a selectively designated actuator is configured to communicate with said plurality of actuators and said input modules via said access point, wherein wireless communication between said access point, said plurality of actuators, and said input modules includes first messages received from said access point by said plurality of actuators and said input modules Broadcast for reply by said plurality of actuators and said input modules, or Multicast for reply by certain of said plurality of actuators and said input modules, said first messages comprising a destination address field and a network address of said access point loaded in a data field of said first messages, said first messages lacking a source address field, second messages in reply to said first message by each of said plurality of actuators and input modules, said second messages comprising at least one of a from address and configuration parameters of said addressed actuators and said input modules, third messages from the access point to a specific one of said plurality of actuators and said input modules Unicast for reply by said specific one of said plurality of actuators and said input modules, said third messages comprising a destination address field and a network address of said access point loaded in a data field of said third messages, said third messages lacking a source address field, and fourth messages in reply to said third messages, whereby said specific one of said plurality of actuators and said input modules sends said fourth messages comprising data from said one of said input modules, said fourth messages lacking a source address field.

* * * * *